(12) United States Patent
Chen et al.

(10) Patent No.: US 10,417,369 B2
(45) Date of Patent: Sep. 17, 2019

(54) SEMICONDUCTOR DEVICE, CORRESPONDING MASK AND METHOD FOR GENERATING LAYOUT OF SAME

(71) Applicant: TAIWAN SEMICONDUCTOR MANUFACTURING COMPANY, LTD., Hsinchu (TW)

(72) Inventors: Yu-Jen Chen, Tainan (TW); Ling-Sung Wang, Tainan (TW); I-Shan Huang, Tainan (TW); Chan-yu Hung, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

(21) Appl. No.: 15/949,804

(22) Filed: Apr. 10, 2018

(65) Prior Publication Data

US 2018/0341736 A1 Nov. 29, 2018

Related U.S. Application Data

(60) Provisional application No. 62/511,481, filed on May 26, 2017.

(51) Int. Cl.
*G06F 17/50* (2006.01)
*H01L 27/088* (2006.01)
(Continued)

(52) U.S. Cl.
CPC .......... *G06F 17/5072* (2013.01); *G03F 1/36* (2013.01); *G03F 1/70* (2013.01); *G06F 17/5068* (2013.01);
(Continued)

(58) Field of Classification Search
CPC .......... G06F 17/5068; G06F 17/5072; G06F 17/5081; G06F 2217/12; G03F 1/36
(Continued)

(56) References Cited

U.S. PATENT DOCUMENTS 7,260,442 B2   8/2007  Hwang et al.
9,256,709 B2   2/2016  Yu et al.
(Continued)

*Primary Examiner* — Phallaka Kik
(74) *Attorney, Agent, or Firm* — Hauptman Ham, LLP

(57) ABSTRACT

A semiconductor structure includes: first and second active regions arranged in a first grid oriented in a first direction; and gate electrodes arranged spaced apart in a second grid and on corresponding ones of the active regions, the second grid being oriented in a second direction, the second direction being substantially perpendicular to the first direction; wherein: the first and second active regions are separated, relative to the second direction, by a gap; each gate electrode includes a first segment and a gate extension; each gate extension extends, relative to the second direction, beyond the corresponding active region and into the gap by a height $H_{EXT}$, where $H_{EXT} \leq (\approx 150$ nm); and each gate extension, relative to a plane defined by the first and second directions, is substantially rectangular. In an embodiment, the height $H_{EXT}$ is $H_{EXT} \leq (\approx 100$ nm).

20 Claims, 18 Drawing Sheets

(51) Int. Cl.
*H01L 27/02* (2006.01)
*G03F 1/70* (2012.01)
*G03F 1/36* (2012.01)
*H01L 27/092* (2006.01)
*H01L 21/8238* (2006.01)
*H01L 21/027* (2006.01)
*H01L 21/8234* (2006.01)
*H01L 27/11* (2006.01)

(52) U.S. Cl.
CPC ...... *G06F 17/5081* (2013.01); *H01L 27/0207* (2013.01); *H01L 27/0886* (2013.01); *H01L 27/092* (2013.01); *H01L 21/0274* (2013.01); *H01L 21/823431* (2013.01); *H01L 21/823437* (2013.01); *H01L 21/823821* (2013.01); *H01L 21/823828* (2013.01); *H01L 27/0924* (2013.01); *H01L 27/1104* (2013.01)

(58) Field of Classification Search
USPC ................. 716/55, 122, 129, 130; 703/14
See application file for complete search history.

(56) References Cited

U.S. PATENT DOCUMENTS

| | | | |
|---|---|---|---|
| 2005/0224889 A1* | 10/2005 | Oh | H01L 29/42384 257/369 |
| 2013/0234169 A1* | 9/2013 | Kim | H01L 29/66969 257/88 |
| 2013/0313530 A1* | 11/2013 | Seo | H01L 29/66969 257/40 |
| 2014/0040838 A1 | 2/2014 | Liu et al. | |
| 2014/0217483 A1* | 8/2014 | Choi | H01L 29/785 257/288 |
| 2015/0278429 A1 | 10/2015 | Chang | |
| 2016/0111524 A1* | 4/2016 | Ha | H01L 29/66795 438/283 |
| 2016/0190239 A1* | 6/2016 | Suk | H01L 29/0649 257/351 |
| 2016/0276342 A1* | 9/2016 | Lim | H01L 27/0886 |
| 2016/0322304 A1* | 11/2016 | Kim | H01L 21/76897 |
| 2017/0069737 A1* | 3/2017 | Choi | H01L 29/66803 |
| 2017/0221893 A1* | 8/2017 | Tak | H01L 29/0847 |
| 2018/0337167 A1* | 11/2018 | Lin | G06F 17/5072 |

* cited by examiner

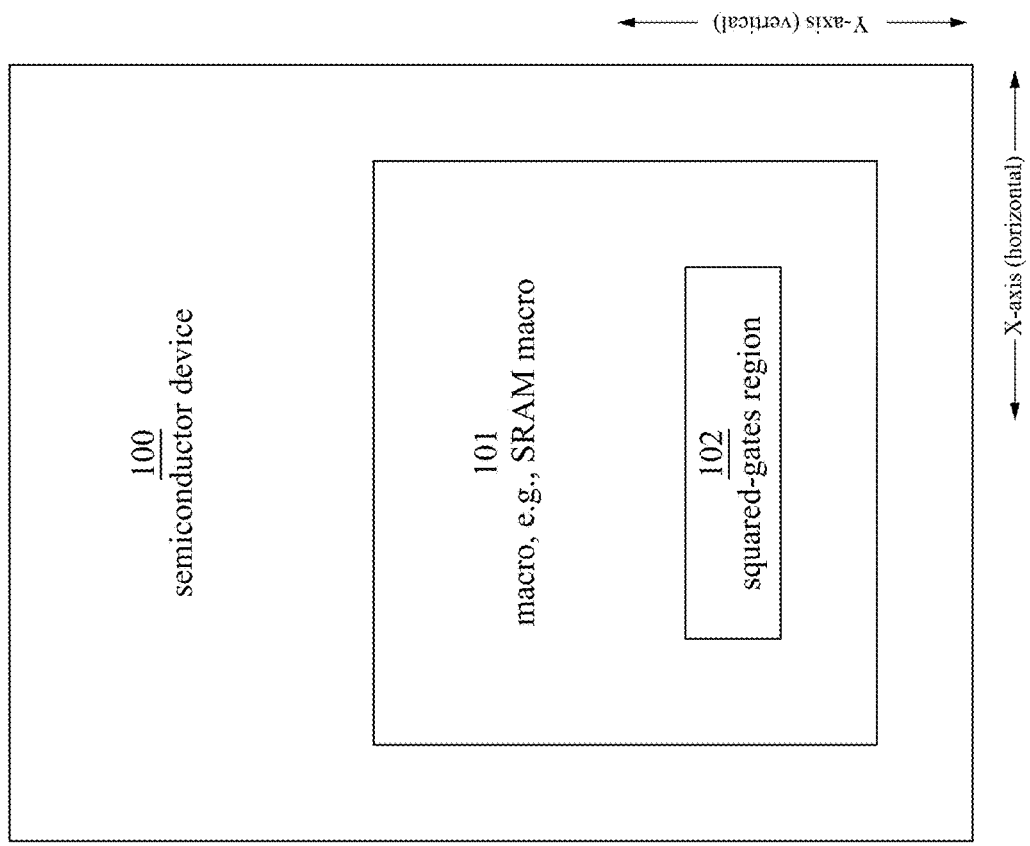

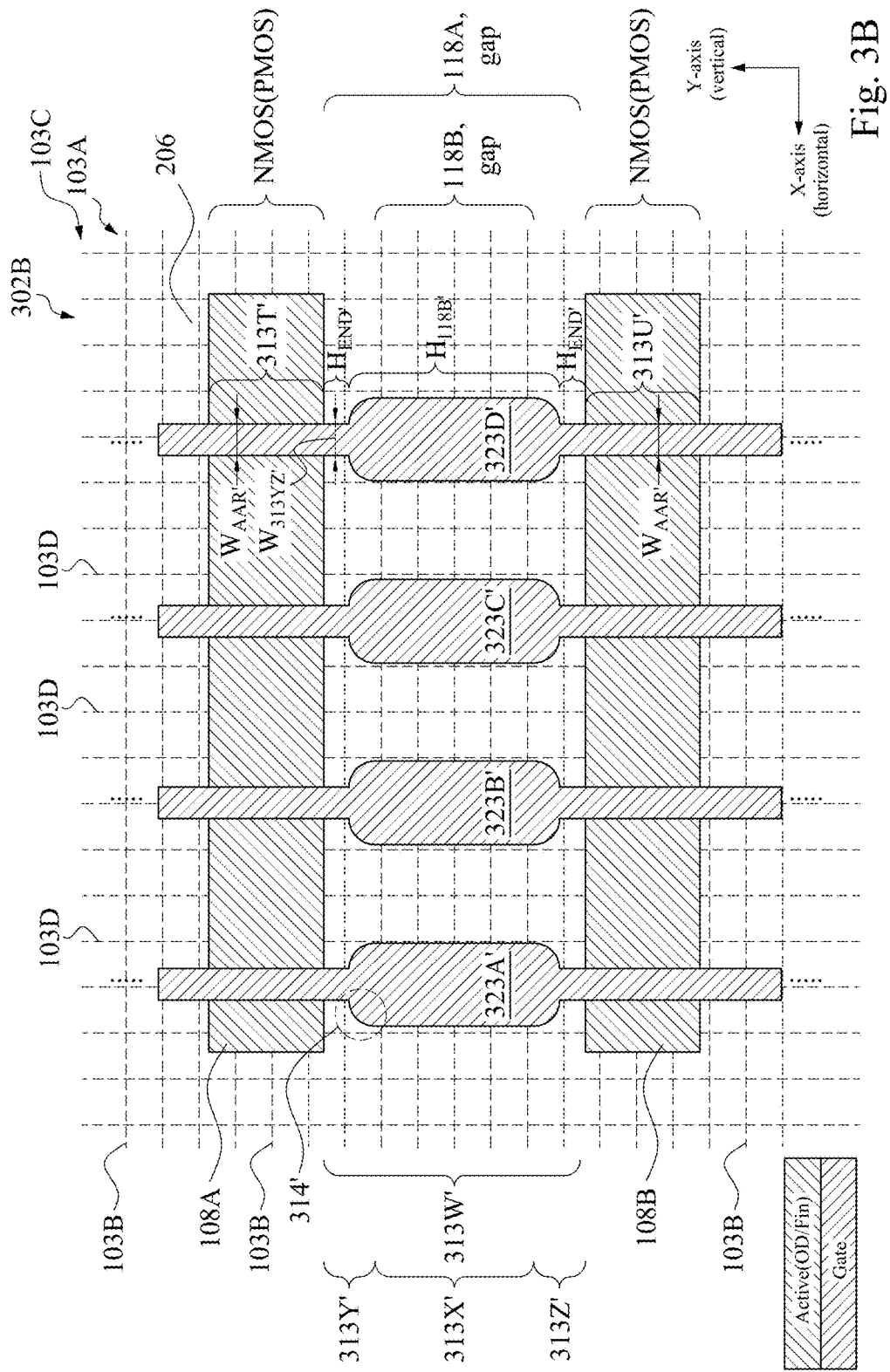

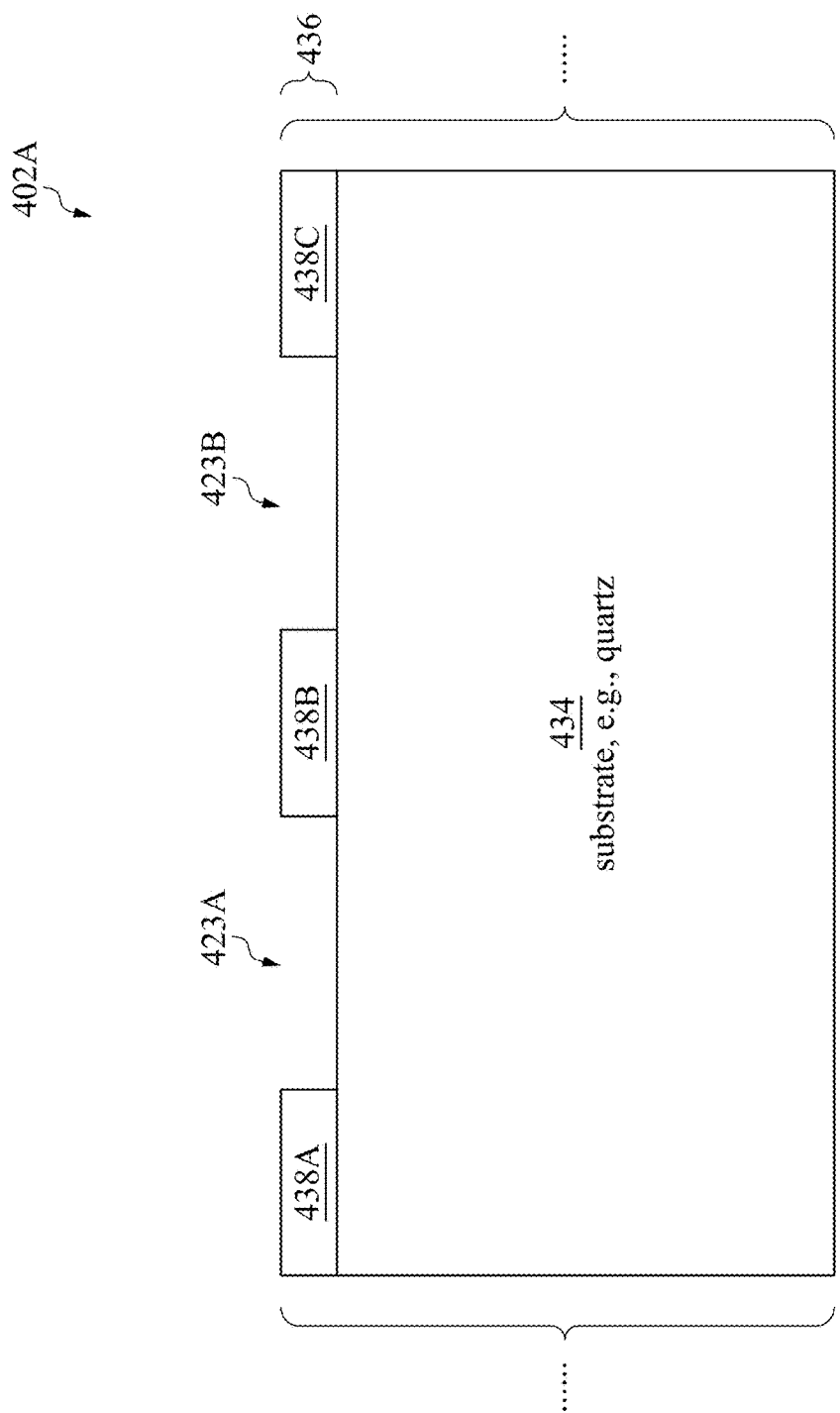

SEMICONDUCTOR DEVICE, CORRESPONDING MASK AND METHOD FOR GENERATING LAYOUT OF SAME

BACKGROUND

In a photolithographic process, a semiconductor device results from a mask based on a corresponding layout diagram. In some approaches, a layout diagram is pre-distorted in a manner which mitigates optical proximity effects (OPEs) that otherwise result in shape distortions in the semiconductor device based on the corresponding layout diagram. In some approaches, OPEs are mitigated after the uncorrected layout diagram has been generated, such as during tape out, using optical proximity correction (OPC).

BRIEF DESCRIPTION OF THE DRAWINGS

One or more embodiments are illustrated by way of example, and not by limitation, in the figures of the accompanying drawings, wherein elements having the same reference numeral designations represent like elements throughout. The drawings are not to scale, unless otherwise disclosed.

FIG. 1A is a block diagram of a semiconductor device, in accordance with at least one embodiment of the present disclosure.

FIG. 3B is a layout diagram of a semiconductor device, in accordance with at least one embodiment of the present disclosure.

FIG. 4 is a cross-sectional diagram of a mask for use in imaging a squared gate-extensions region of a semiconductor device onto a wafer, in accordance with some embodiments.

DETAILED DESCRIPTION

Figure 1B:
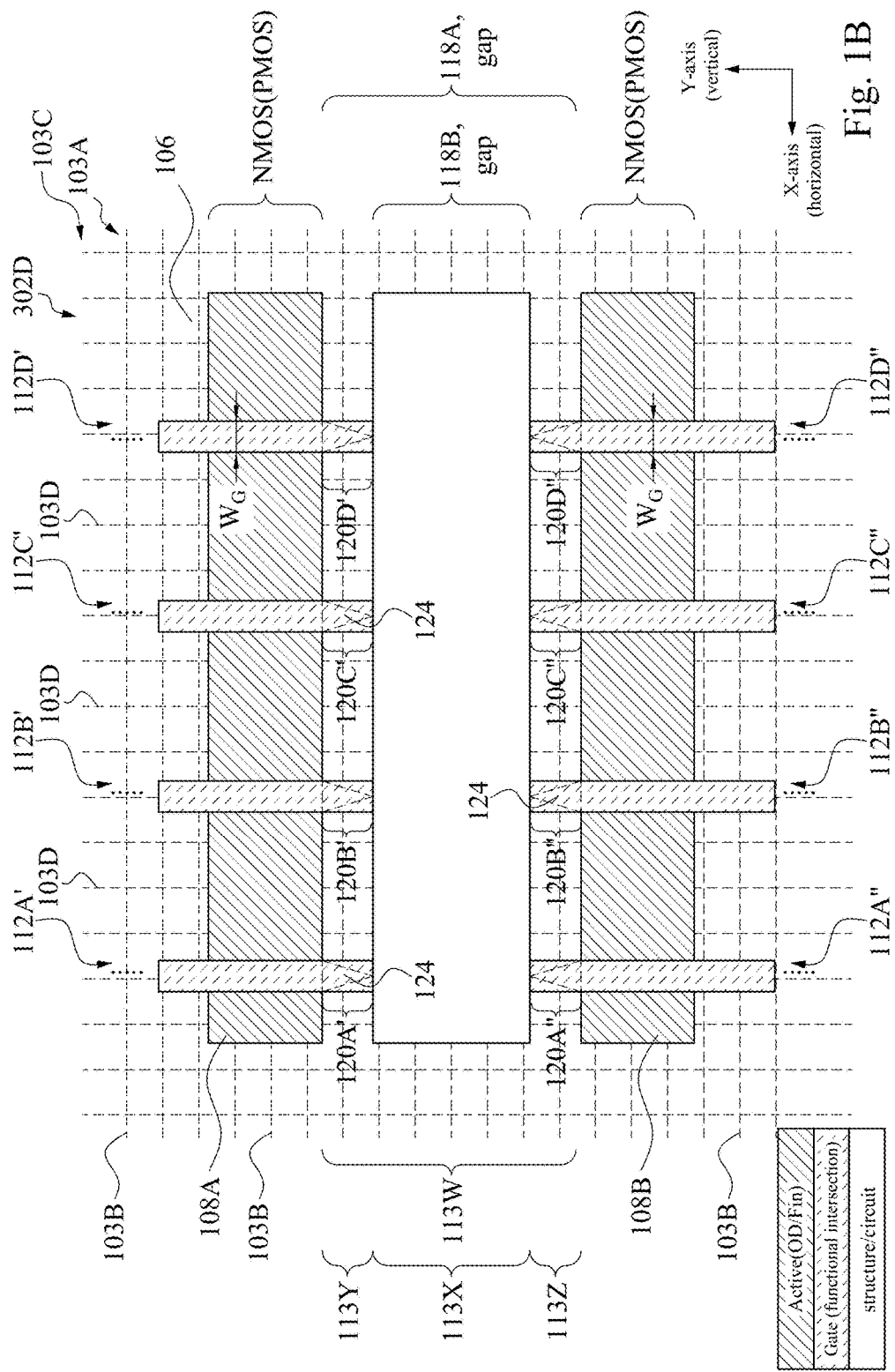
FIG. 1B is a layout diagram of a squared gate-extensions region of a semiconductor device, in accordance with at least one embodiment of the present disclosure.

The following disclosure provides many different embodiments, or examples, for implementing different features of the provided subject matter. Specific examples of components, materials, values, steps, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. The phrases "substantially rectangular," "substantially parallel," "substantially perpendicular," "substantially aligned," "substantially the same," "substantially wider," "substantially square," "substantially symmetric," "substantially removed," and the like should be understood in the context of variations which result from manufacturing process-tolerances.

According to some embodiments, an $(i)^{th}$ layout diagram is pre-distorted in a manner which mitigates etching susceptibilities that otherwise result in over-etch distortions in a corresponding (i)$^{th}$ inchoate version of a semiconductor, where i is a non-negative integer. An inchoate version refers to a version which is not yet completed or fully developed. According to some embodiments, in an (i)$^{th}$ layout diagram, a middle region of a bridge segment of a line pattern (which extends across a gap between neighboring active regions) is pre-distorted by being widened such that the resulting width of the middle region is greater than the width of other parts of the line pattern. In some embodiments, the middle region of the line pattern is widened in anticipation that a corresponding conductive line in a corresponding (i)$^{th}$ inchoate version of the semiconductor device subsequently will be subjected to cutting/etching based on an (i+j)$^{th}$ layout diagram, where j is a positive integer. According to some embodiments, such mitigation is implemented during the design of a layout diagram rather than during OPC.

FIG. 1A is a block diagram of a semiconductor device 100, in accordance with at least one embodiment of the present disclosure.

In FIG. 1A, semiconductor device 100 includes, among other things, a circuit macro/module 101. In some embodiments, circuit macro/module 101 is understood in the context of an analogy to the architectural hierarchy of modular programming in which subroutines/procedures are called by a main program (or by other subroutines) to carry out a given computational function. In this context, semiconductor device 100 uses circuit macro/module 101 to form one or more given functions. Accordingly, in this context and in terms of architectural hierarchy, semiconductor device 100 is analogous to the main program and circuit macro/module (hereinafter, macro) 101 is analogous to subroutines/procedures. In some embodiments, macro 101 is a soft macro. In some embodiments, macro 101 is a hard macro. In some embodiments, macro 101 is a soft macro which is described/couched in register-transfer level (RTL) code. In some embodiments, synthesis, placement and routing have yet to have been performed on macro 101 such that the soft macro can be synthesized, placed and routed for a variety of process nodes. In some embodiments, macro 101 is a hard macro which is described/couched in a binary file format (e.g., Graphic Database System II (GDSII) stream format), where the binary file format represents planar geometric shapes, text labels, other information and the like of one or more layout diagrams of macro 101 in hierarchical form. In some embodiments, synthesis, placement and routing have been performed on macro 101 such that the hard macro is specific to a particular process node.

In some embodiments, macro 101 is an SRAM macro. In some embodiments, macro 101 is another macro such as another type of RAM, a ROM, phase lock loops (PLLs), special function circuits, or the like. Macro 101 includes, among other things, a squared gate-extensions region 102. In some embodiments, squared gate-extensions region 102 corresponds to a part of or an entirety of an instance of a standard cell structure, where the standard cell structure is included in a library of various standard cell structures.

FIG. 1B is a layout diagram of a squared gate-extensions region 102 of a semiconductor device, in accordance with at least one embodiment of the present disclosure. In some embodiments, the semiconductor device is semiconductor device 100 of FIG. 1A.

There are at least two types of layout diagrams. A first (or 'pre-cut') type of layout diagram represents inchoate structures and corresponding 'cut' regions. FIGS. 2A-2D (discussed below) are examples of a pre-cut layout diagram. An inchoate version refers to a version which is not yet completed or fully developed. A second (or 'post-cut') type of layout diagram represents the structures resulting from the corresponding pre-cut layout diagram. FIG. 1B and FIGS. 3B-3D (discussed below) are examples of a post-cut layout diagram. Regarding the pre-cut layout diagram, an inchoate version of a structure refers to a version of the structure which is not yet completed or fully developed. A cut region of a pre-cut layout diagram indicates that a portion of a corresponding structure underlying the cut region will be removed (or cut). Here, because a portion of a given structure which underlies a corresponding cut region will be removed (or cut), the given structure is not yet completed or fully developed, and so the given structure is referred to herein as an inchoate structure.

In FIG. 1B, active areas 108A-108B are formed as substantially rectangular shapes disposed on a substrate 106, where long axes of active areas 108A-108B are substantially parallel to a first direction. Active areas 108A-108B are separated by a gap 118A, relative to a second direction, where the second direction is substantially perpendicular to the first direction. Gate electrodes 112A', 112A", 112B', 112B", 112C', 112C", 112D' and 112D" are formed as substantially rectangular shapes over corresponding active areas 108A-108B, where long axes of gate electrodes 112A', 112A", 112B', 112B", 112C', 112C", 112D' and 112D" are substantially parallel to the second direction. In a gap 118B which separates gate electrodes 112A', 112B', 112C' and 112D' and corresponding gate electrodes 112A", 112B", 112C" and 112D", relative to the second direction, a structure 130 is formed on a substrate 106. In some embodiments, structure 130 includes at least some components of a circuit. In some embodiments, structure 130 includes at least a portion of a power rail/strap, e.g., VDD, VSS or the like.

As noted, active areas 108A-108B are formed as substantially rectangular shapes. In some embodiments, active areas 108A-108B have other shapes. For simplicity of illustration, FIG. 1B shows two active areas, namely 108A-108B. In some embodiments, greater numbers of active areas are provided. Active areas 108A-108B are arranged relative to a grid 103A which is imaginary and which includes parallel first reference lines/tracks 103B which are imaginary and which lie in the first direction. In FIG. 1B, the first direction is the horizontal direction and the second direction is the vertical direction. In some embodiments, the first direction is the vertical direction and the second direction is the horizontal direction. In some embodiments, the substantially perpendicular relation between the first and second directions is maintained though the first direction is a direction other than the horizontal or vertical directions.

In some embodiments, active areas 108A-108B are configured for NMOS technology. In some embodiments, active areas 108A-018B are configured for PMOS technology. In some embodiments, active area 108A is configured for NMOS technology and active area 108B is configured for PMOS technology. In some embodiments, active area 108A is configured for PMOS technology and active area 108B is configured for NMOS technology. In some embodiments, active areas 108A-108B are configured for planar FET technology. In some embodiments, active areas 108A-108B are configured for finFET technology.

Where configured for finFET technology, active areas 108A-108B include instances of fins (not shown) arranged substantially at least parallel to, if not collinearly with respect to, corresponding ones of first reference lines/tracks 103B, and thus are substantially parallel to the horizontal direction. The fins may be patterned by any suitable method. For example, the fins may be patterned using one or more photolithography processes, including double-patterning or multi-patterning processes. Generally, double-patterning or multi-patterning processes combine photolithography and self-aligned processes, allowing patterns to be created that have, for example, pitches smaller than what is otherwise obtainable using a single, direct photolithography process. For example, in one embodiment, a sacrificial layer is formed over a substrate and patterned using a photolithography process. Spacers are formed alongside the patterned sacrificial layer using a self-aligned process. The sacrificial layer is then removed, and the remaining spacers may then be used to pattern the fins. Additional details regarding the structure and manufacture of CMOS finFET technology are disclosed in commonly assigned U.S. Pat. No. 8,786,019, granted Jul. 22, 2014, the entirety of which is hereby incorporated by reference.

In some embodiments, active areas are configured into one or more instances of a first row which are interleaved with one or more instances of a second row. Each instance of the first row and of the second row is arranged to be substantially parallel to the first direction. Each instance of the first row and of the second row includes a predetermined number of the first reference lines/tracks 103B. In some embodiments, instances of the first row have a first conductivity and instances of the second row have a second conductivity. In some embodiments, instances of the first row are configured for PMOS technology and instances of the second row are configured for NMOS technology. In some embodiments, instances of the first row are configured for NMOS technology and instances of the second row are configured for PMOS technology.

For simplicity of illustration, FIG. 1B shows eight gate electrodes, namely 112A', 112A", 112B', 112B", 112C', 112C", 112D' and 112D". In some embodiments, fewer or greater numbers of gate electrodes are provided. Gate electrodes 112A', 112A", 112B', 112B", 112C', 112C", 112D' and 112D" are arranged relative to a grid 103C which is imaginary and which further includes parallel second reference lines/tracks 103D which are imaginary and which lie in the second direction. In some embodiments, the second direction is the vertical direction.

Each of gate electrodes 112A', 112A", 112B', 112B", 112C', 112C", 112D' and 112D" extends in the vertical direction a predetermined distance/height, $H_{120}$, into gap 118A such that the extension of the gate electrode ("gate-extension") terminates at the edge of gap 118B. In particular, gate electrodes 112A', 112C', 112B' and 112D' include corresponding gate-extensions 120A', 120B', 120C' and 120D', and gate electrodes 112A", 112B", 112C" and 112D" include corresponding gate-extensions 120A", 120B", 120C" and 120D". In some embodiments, the extension of the gate electrode is provided to facilitate a functional connection between the gate electrode and the corresponding underlying active region. Gate-extensions 120A', 120A", 120B', 120B", 120C', 120C", 120D' and 120D" are substantially rectangular. In particular, gate-extensions 120A', 120A", 120B', 120B", 120C', 120C", 120D' and 120D" do not have a deformed shape 124, which is triangular or conical, and which is an over-etch distortion resulting from an etching process for forming the same. Compared to deformed shape 124, the substantially rectangular shape of gate-extensions 120A', 120A", 120B', 120B", 120C', 120C", 120D' and 120D" more effectively facilitates the functional connection between associated gate electrodes 112A', 112A", 112B', 112B", 112C', 112C", 112D' and 112D" and corresponding underlying active regions 108A-108B. In some embodiments, the height $H_{120}$ in the vertical direction of the gate-extension is less than or equal to about a three times multiple of a width, $W_G$, in the horizontal direction of the gate electrode, wherein $H_{120} \leq (\approx 3W_G)$. In some embodiments, $H_{120} \leq (\approx 2W_G)$. In some embodiments, $W_G \leq (\approx 50$ nm). In some embodiments, $H_{120} \leq (\approx 150$ nm). In some embodiments, $H_{120} \leq (\approx 100$ nm). In some embodiments, $H_{120} \leq (\approx 50$ nm).

Figure 2A:
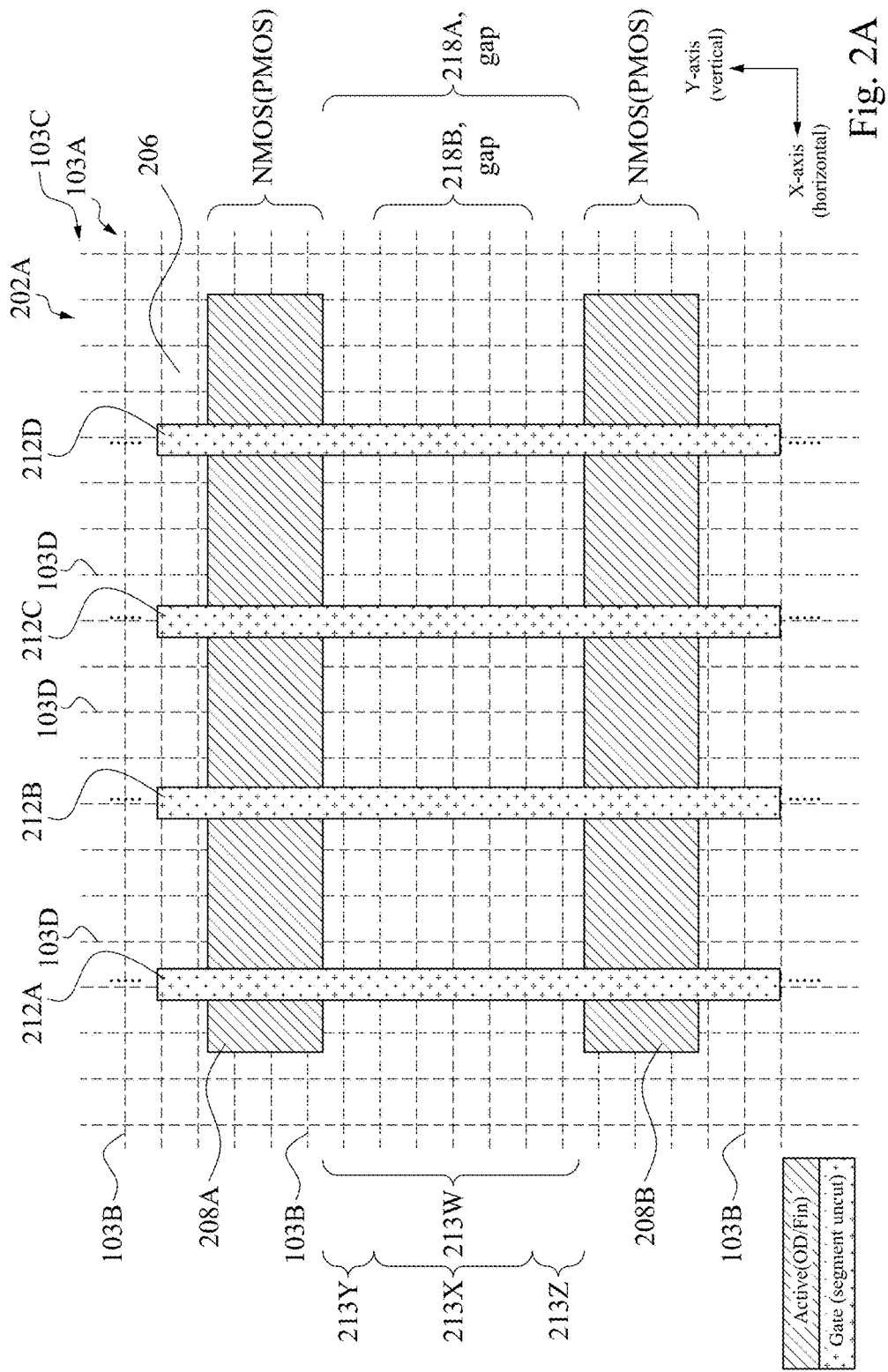
FIG. 2A is a layout diagram of a squared gate-extensions region of a semiconductor device, in accordance with some embodiments.

FIG. 2A is a layout diagram 202A of a squared gate-extensions region of a semiconductor device, in accordance with some embodiments. In some embodiments, a squared gate-extensions region of a semiconductor device which will be produced from layout diagram 202A is squared gate-extensions region 102 of FIG. 1B. As such, FIG. 2A is similar to FIG. 1B. Accordingly, relative to FIG. 1B, the numbering of similar objects in FIG. 2A is increased by 100.

In FIG. 2A, active area ("AR") patterns 208A-208B are generated as substantially rectangular shapes which are disposed on a surface 206, where surface 206 represents substrate 106, and where long axes of AR patterns 208A-208B are substantially parallel to the first direction. In FIG. 2A, the first direction is the horizontal direction. In some embodiments, the first direction is a direction other than the horizontal direction. Active regions 108A-108B are examples of active regions resulting from AR patterns 208A-208B. AR patterns 208A-208B are separated by a gap 218A, relative to the second direction. Gate patterns 212A, 212B, 212C and 212D are generated as substantially rectangular shapes which are disposed over corresponding AR patterns 208A-208B, where long axes of gate patterns 212A, 212B, 212C and 212D are substantially parallel to the second direction. After the effects of cut-patterns (see discussion below) are taken into consideration, gate electrodes 112A', 112A", 112B', 112B", 112C', 112C", 112D' and 112D" are examples of gate electrodes resulting from corresponding gate patterns 212A, 212B, 212C and 212D.

Each of gate patterns 212A, 212B, 212C and 212D includes a bridge segment 213W which lies over ("overlies") gap 218A. Each bridge segment 213W includes a central section 213X and two arm sections 213Y and 213Z. In FIG. 2A, a midline of a structure/area is oriented perpendicularly to the long axis of the structure/area. By contrast, a centerline of a structure/area is oriented parallel to the long axis of the structure. For each bridge segment 213W: the long axes of gap 218 are substantially parallel to the vertical direction, and the long axis of gap 218A is substantially parallel to the horizontal direction; midlines of central section 213X and a centerline of gap 218A are substantially aligned; central section 213X has a height in the vertical direction which is substantially the same as the height in the vertical direction of gap 218B; arm section 213Y extends between central section 213X and AR pattern 208A; and arm section 213Z extends between central section 213X and AR pattern 208A. Each of gate patterns 212A, 212B, 212C and 212D also includes an above-active-region (AAR) segment 213T and an AAR segment 213U which overlie corresponding AR patterns 208A-208B. As such, a width, $W_G$, gate electrode 112D' in FIG. 1B corresponds to a width of AAR segment 213T, $W_{AAR}$, in FIG. 2A.

Figure 2B:
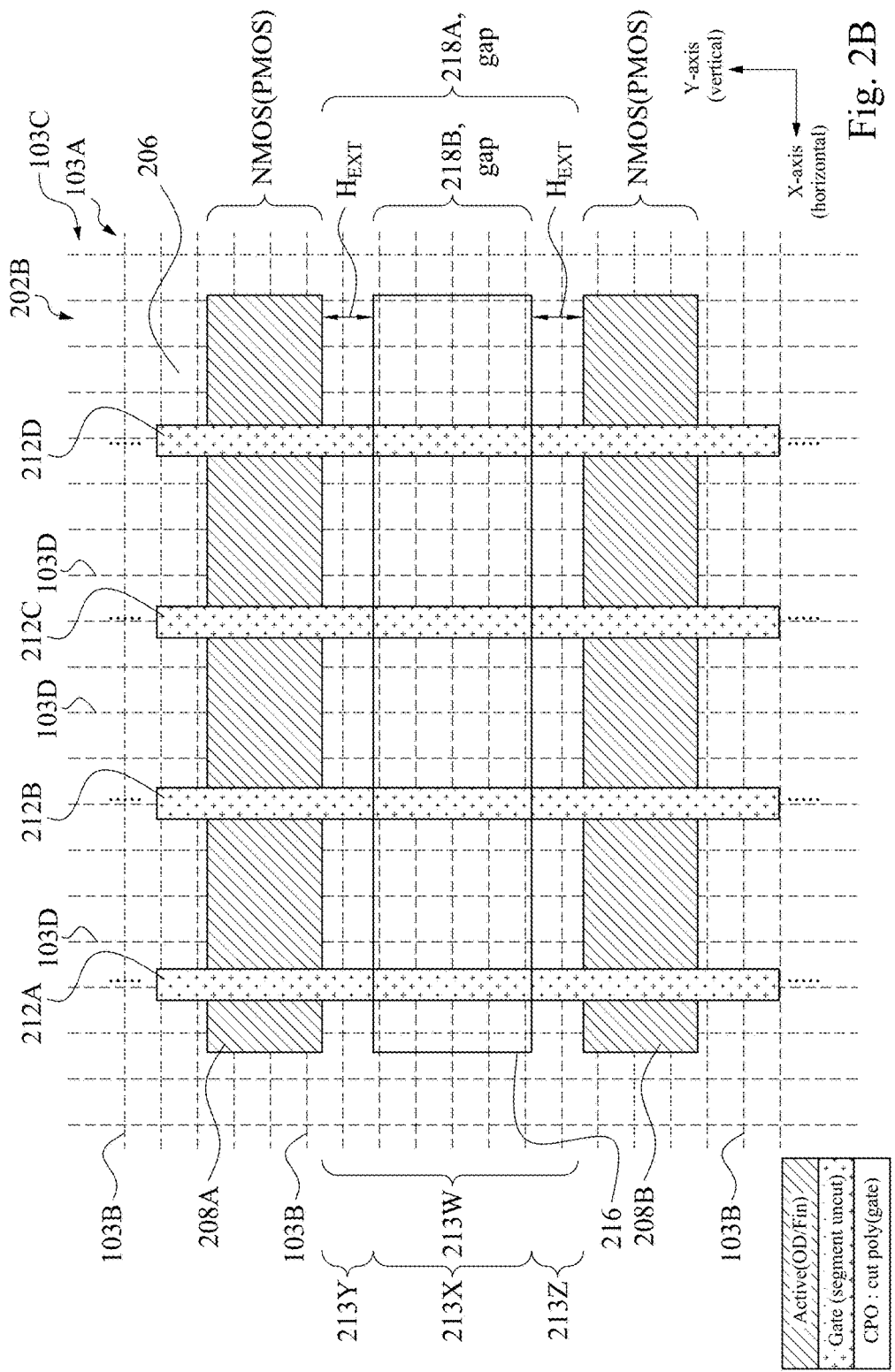
FIG. 2B is a layout diagram of a squared gate-extensions region of a semiconductor device, in accordance with some embodiments.

FIG. 2B is a layout diagram 202B of a squared gate-extensions region of a semiconductor device, in accordance with some embodiments. In some embodiments, a squared gate-extensions region of a semiconductor device which will be produced from layout diagram 202B is squared gate-extensions region 102 of FIG. 1B.

Depending upon the semiconductor device(s) which is intended to be produced based at least in part on layout diagram 202B, one or more portions of one or more of gate patterns 212A-212D eventually will be removed/cut. An instance of a cut pattern is used to indicate one or more portions of corresponding one or more gate patterns 212A-212D which eventually will be removed/cut. For simplicity of illustration, FIG. 2B show one pattern based on which electrodes resulting from corresponding gate patterns 212A-212D will be cut resulting in a gap 218B.

To produce a gap 218B, a cut-pattern 216 is generated as a substantially rectangular shape which is disposed on gate patterns 212A-212D, where a long axis of cut-pattern 216 is substantially parallel to the first direction. In some embodiments, cut-pattern 216 has other shapes. In some embodiments, multiple cut patterns are provided which, in the aggregate, result in substantially the same amounts of gate patterns 212A-212D being removed as would be removed by cut-pattern 216.

Determination of the height in the vertical direction of cut-pattern 216 sets the height of central sections 213X of bridge segments 213W of gate patterns 212A-212D, and consequently sets the heights in the vertical direction of arm sections 213Y and 213Z of bridge segments 213W. In particular, the height of cut-pattern 216 is set so that a consequential height of arm sections 213Y and 213Z is sufficient to ensure that gate electrodes 112A'-112A", 112B'-112B", 112C'-112C" and 112D'-112D" resulting from corresponding gate patterns 212A-212D will extend a predetermined distance in the second direction beyond corresponding active regions 108A-108B. Cut-pattern 216 is sized and disposed between AR patterns 208A-208B such that height $H_{120}$ in the vertical direction of the resultant gate-extensions is less than or equal to about a three times multiple of a width, $W_{AAR}$, in the horizontal direction of AAR segments 213T-213U, wherein $H_{EXT} \leq (\approx 3 W_{AAR})$. In some embodiments, $H_{EXT} \leq (\approx 2 W_{AAR})$. In some embodiments, $W_{AAR} \leq (\approx 50$ nm). In some embodiments, $H_{EXT} \leq (\approx 150$ nm). In some embodiments, $H_{EXT} \leq (\approx 100$ nm).

Figure 2C:
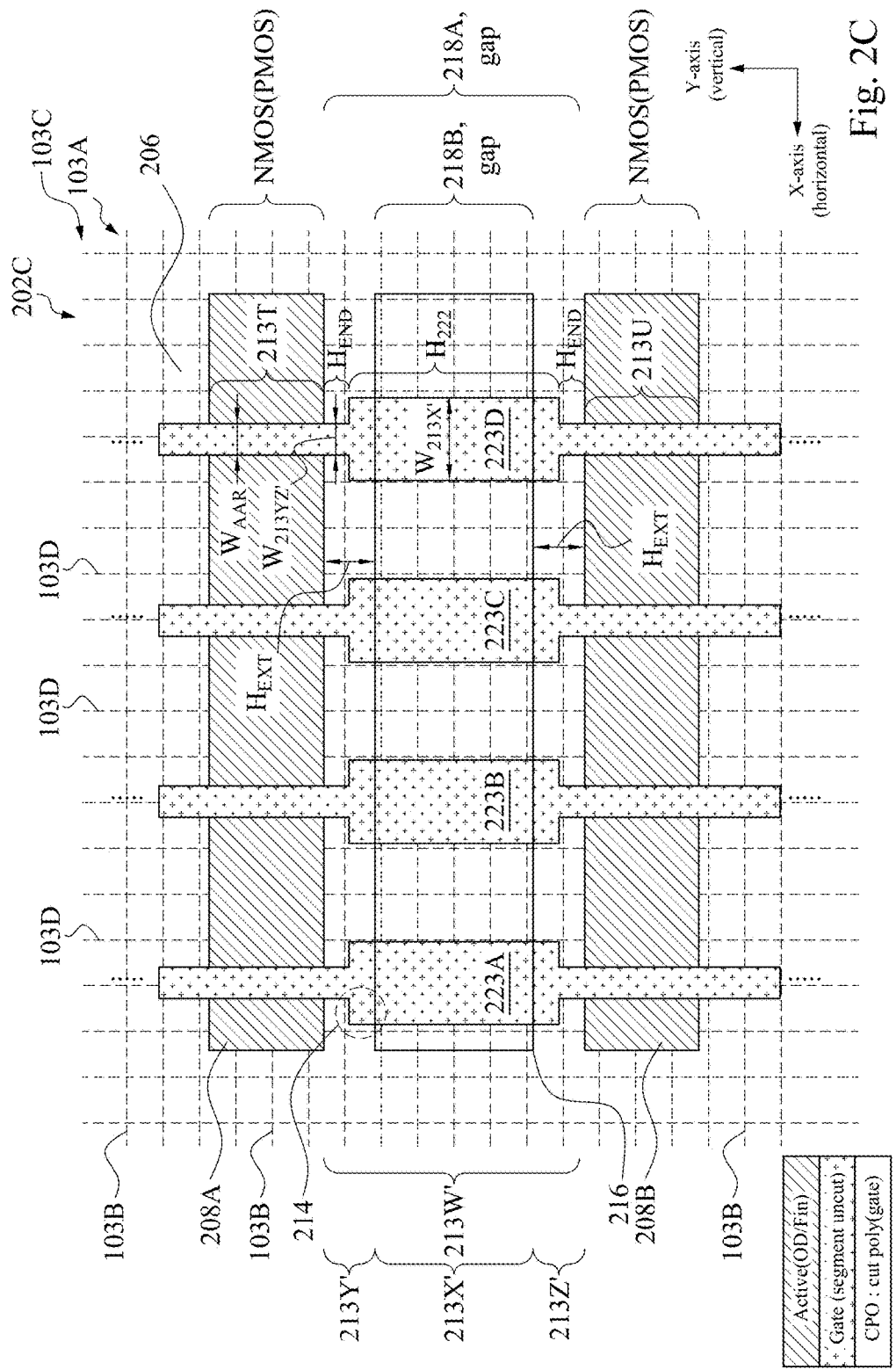
FIG. 2C is a layout diagram of a squared gate-extensions region of a semiconductor device, in accordance with some embodiments.

FIG. 2C is a layout diagram 202C of a squared gate-extensions region of a semiconductor device, in accordance with some embodiments. In some embodiments, a squared gate-extensions region of a semiconductor device which will be produced from layout diagram 202C is squared gate-extensions region 102 of FIG. 1B.

In FIG. 2C, and relative to FIG. 2B, central section 213X' of each of gate patterns 212A, 212B, 212C and 212D of FIG. 2B has been widened in the horizontal direction to form corresponding gate patterns 223A, 223B, 223C and 223D. Each of gate patterns 223A, 223B, 223C and 223D has a long axis substantially parallel to the vertical direction. Each of gate patterns 223A, 223B, 223C and 223D, relative to the long axis, includes two AAR segments 213T and 213U separated by a bridge segment 213W' which extends across gap 218A between neighboring ones of AR patterns 208A-208B. Each bridge segment 213W' includes two arm sections 213Y' and 213Z' separated by a central section 213X'. Each of arm sections 212Y' and 213Z' has a proximal end and a distal end, the proximal end being nearer to central section 213X' than the distal end. A middle region of each bridge segment 213W' includes central section 213X' and the proximal ends of each of arm sections 213Y'-213Z'. Each middle region is substantially wider in the horizontal direction than corresponding AAR segments 213T-213U. Each of arm sections 213Y' and 213Z' is T-shaped with substantially square shoulders 214.

Also in FIG. 2C, and relative to FIG. 2B, central section 213X' of each of gate patterns 212A, 212B, 212C and 212D has been widened in the horizontal direction to a width $W_{213X}$, where:

$$W_{213X} > W_{AAR}.$$

In some embodiments, width $W_{213X}$ falls in a range relative to multiples of a width $W_{213X}$, as follows:

$$(\approx 2 W_{AAR}) \leq W_{213X} \leq (\approx 3 W_{AAR}).$$

In some embodiments, $W_{AAR} \leq (\approx 50$ nm). In some embodiments, $(\approx 100$ nm$) \leq W_{213X} \leq (\approx 150$ nm). Also in FIG. 2C, $W_{AAR} = W_{213YZ}$. In some embodiments, $W_{AAR} \neq W_{213YZ}$.

In some embodiments, for each bridge segment, it is determined if a height, $H_{EXT}$, in the vertical direction of arm sections 213Y and 213Z is less than about a width $W_{AAR}$. For those arm sections 213Y or 213Z segments for which $H_{EXT} \leq W_{AAR}$, then the corresponding ones of central sections 213X are selected to be subjected to widening. In some embodiments, the determination and selection are rule-based and carried out automatically in a manner similar to rule-based OPC. In some embodiments, the widening is performed before performance of optical proximity correction (OPC).

Figure 2D:
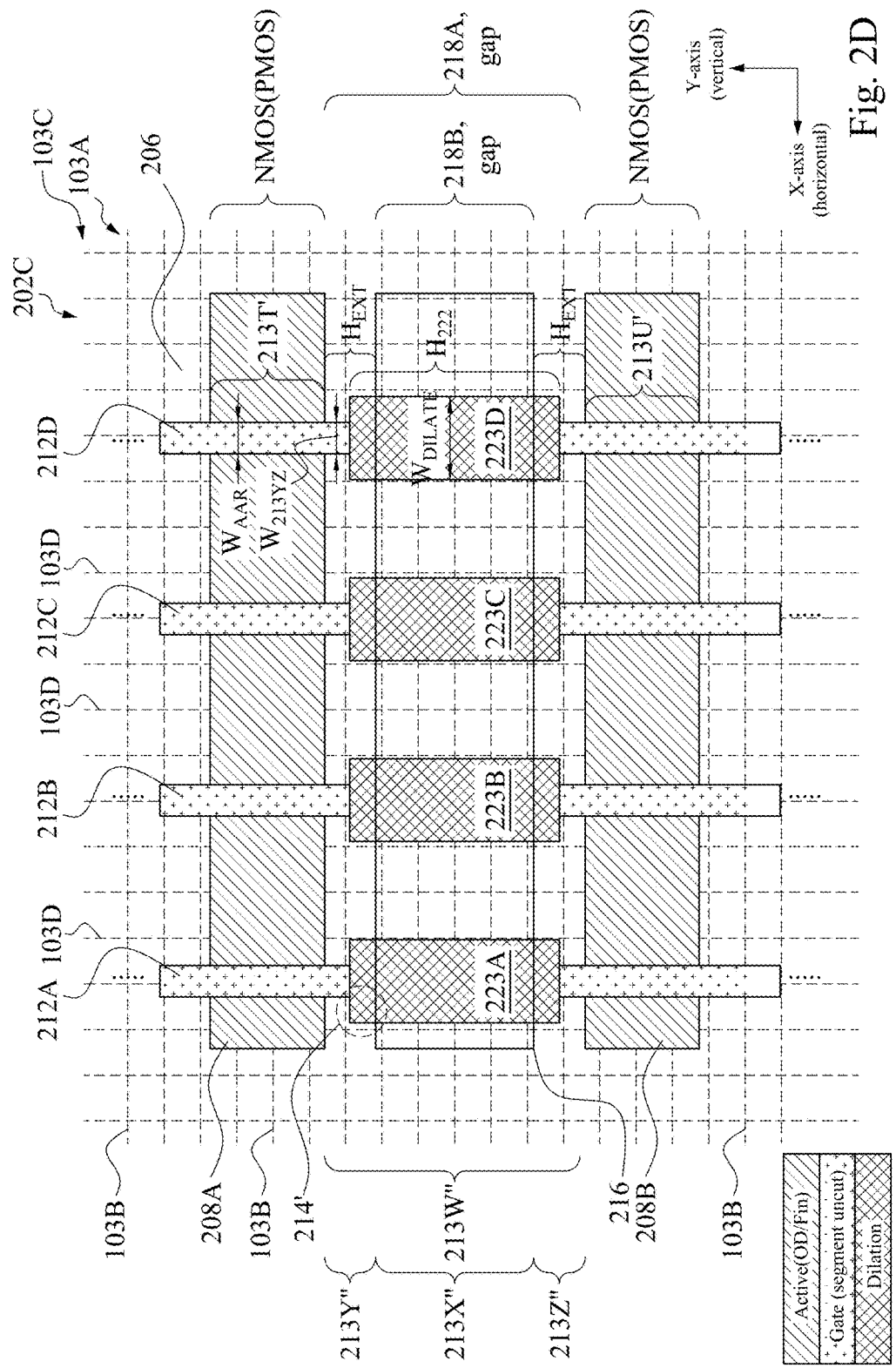
FIG. 2D is a layout diagram of a squared gate-extensions region of a semiconductor device, in accordance with some embodiments.

FIG. 2D is a layout diagram 202D of a squared gate-extensions region of a semiconductor device, in accordance with some embodiments. In some embodiments, a squared gate-extensions region of a semiconductor device which will be produced from layout diagram 202D is squared gate-extensions region 102 of FIG. 1B. FIG. 2D is an alternative to FIG. 2C.

In FIG. 2D, and relative to FIG. 2B, additional dilation patterns 222A-2222D have been generated and inserted between cut-pattern 216 and central section 213X of corresponding gate patterns 212A, 212B, 212C and 212D. Each of gate patterns 212A, 212B, 212C and 212D and corresponding dilation patterns 222A-222D has a long axis substantially parallel to the vertical direction. Each of gate patterns 223A, 223B, 223C and 223D, relative to the long axis, includes two AAR segments 213T and 213U' separated by a bridge segment 213W" which extends across gap 218A between neighboring ones of AR patterns 208A-208B. Each of dilation patterns 222A-222D includes two arm sections 213Y" and 213Z" separated by a central section 213X". A middle region of each bridge segment 213W" corresponds to central section 213X" and portions of arm sections 213Y"-213Z". Each middle region is substantially wider in the horizontal direction than corresponding AAR segments 213T'-213U'. Each of arm sections 213Y" and 213Z" is substantially rectangular with substantially square shoulders 214'.

Relative to central section 213X" of gate patterns 212A, 212B, 212C and 212D, corresponding dilation patterns 222A-222D are wider in the horizontal direction than width $W_{AAR}$ such that width $W_{DILATE}$ of dilation patterns 222A-222D is $W_{DILATE} > W_{AAR}$. In some embodiments, width $W_{DILATE}$ falls in a range relative to multiples of a width $W_{AAR}$, as follows:

$$(\approx 2 W_{AAR}) \leq W_{DILATE} \leq (\approx 3 W_{AAR}).$$

In some embodiments, $W_{AAR} \leq (\approx 50$ nm). In some embodiments, $(\approx 100$ nm$) \leq W_{DILATE} \leq (\approx 150$ nm).

In some embodiments, for each bridge segment, it is determined if a height, $H_{EXT}$, in the vertical direction of each of the gaps between cut-pattern 216 and corresponding AR patterns 2018-208B is less than about a width $W_{AAR}$. For those gaps for which $H_{EXT} \leq W_{AAR}$, then the corresponding ones of bridge segments 213W" are selected for insertion of a corresponding dilation pattern. In some embodiments, the determination and selection are rule-based and carried out automatically in a manner similar to rule-based OPC. In some embodiments, the widening is performed before performance of optical proximity correction (OPC).

Figure 3A:
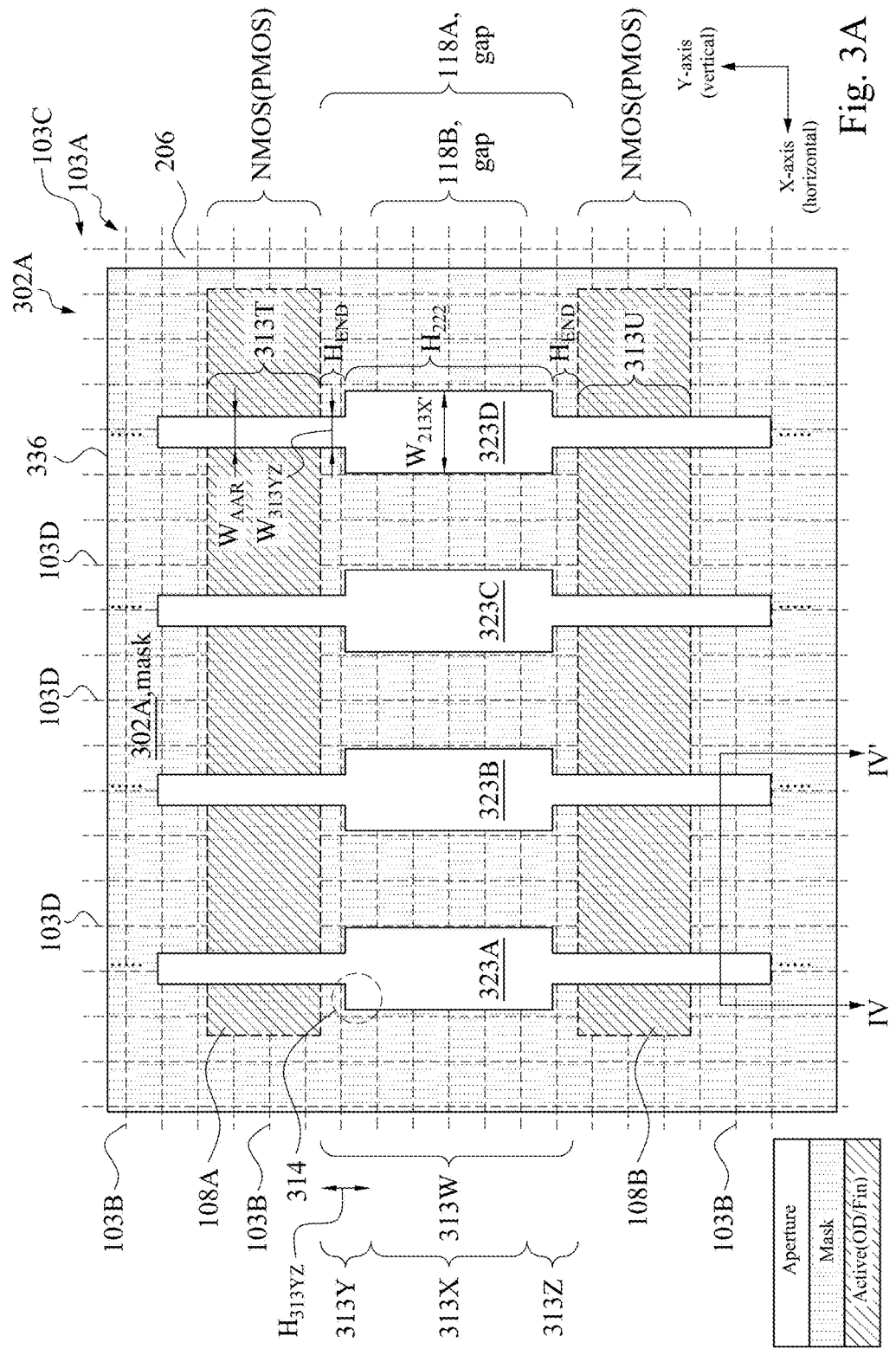
FIG. 3A is a layout diagram of a mask for use in imaging a squared gate-extensions region of a semiconductor device onto a wafer, in accordance with some embodiments.

FIG. 3A is a layout diagram of a mask 302A for use in imaging a squared gate-extensions region of a semiconductor device onto a wafer, in accordance with some embodiments. In some embodiments, mask 302A is based on layout diagram 202C albeit without cut-pattern 216. In some embodiments, mask 302A is based on layout diagram 202D albeit without cut-pattern 216. A cross-sectional structure of mask 302A is discussed below in the context of FIG. 4.

In FIG. 3A, a layer 336, which is opaque, is formed on a transparent substrate (see 434 of FIG. 4, discussed below). Layer 336 has apertures 323A-323D formed therein for photolithographically producing gate patterns on a semiconductor device including active regions arranged in a first grid oriented in a first direction. Examples of the active regions include active regions 108A-108B of FIG. 1B. An example of the first direction is the horizontal direction, and an example of the first grid is grid 103A of FIG. 1B. Apertures 323A-323D are arranged spaced apart in a second grid, the second grid being oriented in a second direction, the second direction being perpendicular to the first direction. An example of the second direction is the vertical direction and an example of the second grid is grid 103C of FIG. 1B. When mask 302A is aligned with respect to the semiconductor device, apertures 323A-323D overlie corresponding ones of the active regions 108A-108B.

Each of apertures 323A-323D has a long axis substantially parallel to the vertical direction. Each of apertures 323A-323D, relative to the long axis, includes two above-active-region (AAR) portions 313T and 313U separated by a bridge portion 313W which extends across gap 118A between neighboring ones of active regions 108A-108B. Each bridge portion 313W includes two arm zones 313Y and 313Z separated by a central zone 313X. Each of arm zones 313Y and 313Z is T-shaped with substantially square shoulders 314. More particularly, the T-shape of each of arm zones 313Y and 313Z has an overall height of $H_{313YZ}$, a rectangular body of width $W_{313YZ}$ and height $H_{END'}$, which is capped with a trapezoidal area. Each central zone 313X is substantially wider in the horizontal direction than corresponding arm zones 313Y-313Z.

Each of apertures 323A-323D has a centerline substantially parallel to the vertical direction. Each of apertures 323A-323D is substantially symmetric about the centerline thereof. In some embodiments width $W_{313YZ}$ is greater than or equal to about $H_{END}$, as follows:

$$(\approx H_{END}) \le W_{313YZ}.$$

In some embodiments, height $H_{END}$ is approximately equal to a width, $W_{AAR}$, in the horizontal direction of AAR portions 313T and 313U. In some embodiments, $W_{AAR} \le (\approx 50 \text{ nm})$ such that $(\approx H_{END}) \le (\approx 50 \text{ nm})$. In some embodiments, a width, $W_{313X}$, of central zones in the horizontal direction falls in a range relative to multiples of width $W_{313YZ}$, as follows:

$$(\approx 2 W_{313YZ}) \le W_{313X} \le (\approx 3 W_{313YZ}).$$

In some embodiments, $W_{313YZ} \le (\approx 50 \text{ nm})$. In some embodiments, $(\approx 100 \text{ nm}) \le W_{313X} \le (\approx 150 \text{ nm})$.

FIG. 3B is a layout diagram of a semiconductor device 302B, in accordance with at least one embodiment of the present disclosure. More particularly, FIG. 3B is a post-cut layout diagram showing structures of semiconductor device 302B resulting from having etched a patterned wafer, where the patterned wafer was produced/masked using a corresponding mask. An example of the corresponding mask is mask 302A of FIG. 3A.

In FIG. 3B, gate electrodes 323A'-323D' are formed on corresponding ones of active regions 108A-108B. Gate electrodes 323A'-323D' are shaped according corresponding apertures 323A-323D in mask 302A of FIG. 3B. Recalling that active regions 108A-108B are arranged in grid 103A which is oriented in the horizontal direction, gate electrodes 323A'-323D' are arranged spaced apart in grid 103C, where grid 103C is oriented substantially in the vertical direction.

Each of gate electrodes 323A'-323D' has a long axis substantially parallel to the vertical direction. Each of gate electrodes 323A'-323D', relative to the long axis, includes two AAR segments 313T' and 313U' separated by a bridge segment 313W' which extends across gap 118A between neighboring ones of active regions 108A-108B. Each bridge segment 313W' includes two arms 313Y' and 313Z' separated by a central section 313X'. Each central section 313X' is substantially wider in the horizontal direction than corresponding arms 313Y'-313Z'. Due to anisotropic effects of etching, each of arms 313Y' and 313Z' is T-shaped albeit with rounded shoulders 314' as compared with substantially square shoulders 314 of arms 313X and 313Y of mask 302A of FIG. 3A.

Each of gate electrodes 323A'-323D' has a centerline substantially parallel to the vertical direction. Each of gate electrodes 323A'-323D' is substantially symmetric about the centerline thereof. In some embodiments, arms 313Y'-313Z' have a width, $W_{313YZ'}$, in the horizontal direction and a height, $H_{END'}$, in the vertical direction such that the width $W_{313YZ'}$ is greater than or equal to about $H_{END'}$, as follows:

$$(\approx H_{END'}) \le W_{313X'}.$$

In some embodiments, height $H_{END'}$ is approximately equal to a width, $W_{AAR'}$, in the horizontal direction of AAR segments 313T' and 313U'. In some embodiments, $W_{AAR'} \le (\approx 50 \text{ nm})$ such that $(\approx H_{END'}) \le (\approx 50 \text{ nm})$. In some embodiments, a width, $W_{313X'}$, of central sections in the horizontal direction falls in a range relative to multiples of width $W_{313YZ'}$, as follows:

$$(\approx 2 W_{313YZ'}) \le W_{313X'} \le (\approx 3 W_{313YZ'}).$$

In some embodiments, $W_{313YZ'} \le (\approx 50 \text{ nm})$. In some embodiments, $(\approx 100 \text{ nm}) \le W_{313X'} \le (\approx 150 \text{ nm})$.

Figure 3C:
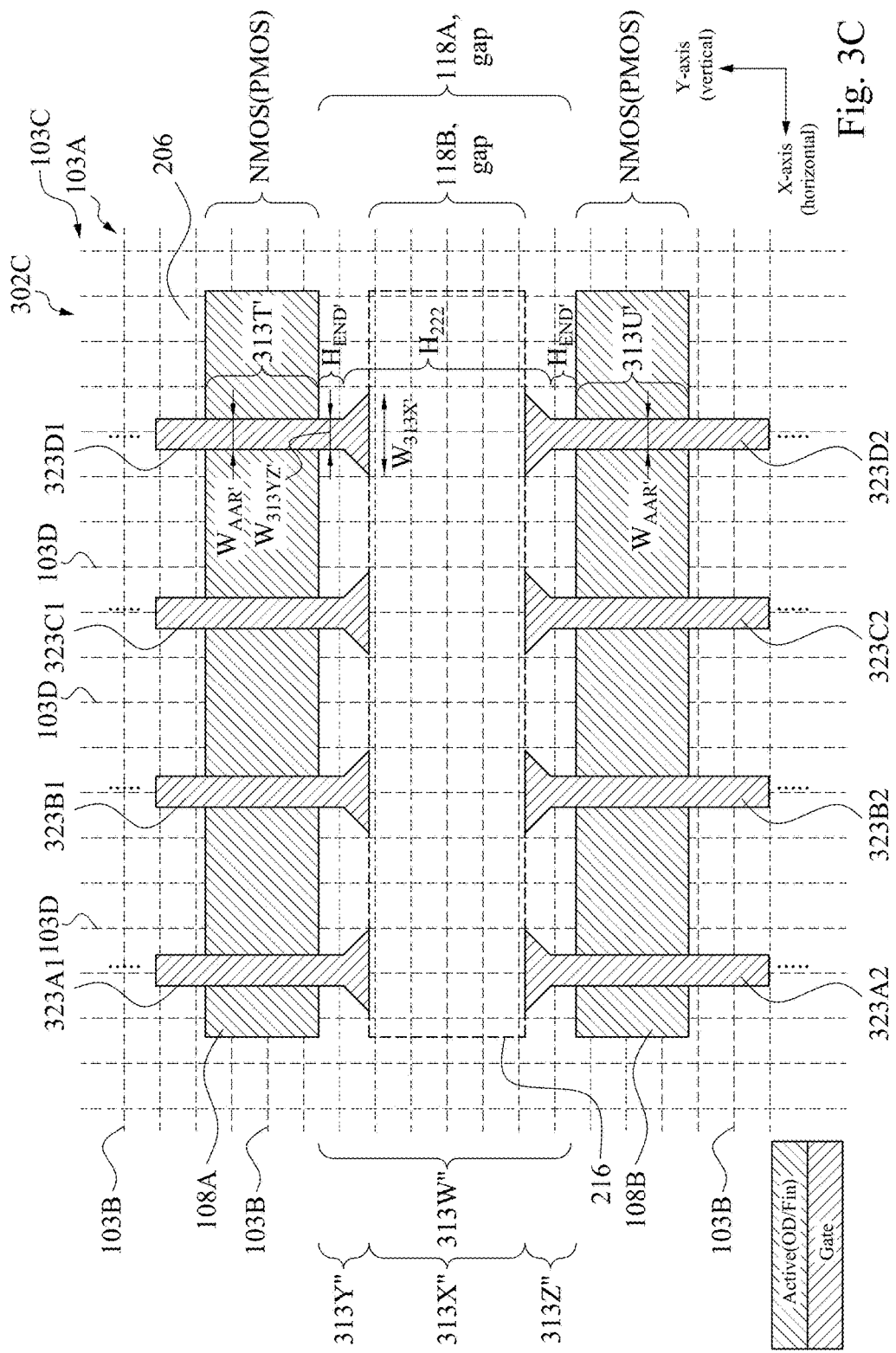
FIG. 3C is a layout diagram of a semiconductor device, in accordance with at least one embodiment of the present disclosure.

FIG. 3C is a layout diagram of a semiconductor device 302C, in accordance with at least one embodiment of the present disclosure. More particularly, FIG. 3C is a post-cut layout diagram showing structures of semiconductor device 302C resulting from having etched a patterned wafer, where the patterned wafer was produced/masked using a corresponding mask. An example of the corresponding mask is a mask which implements cut-pattern 216 of FIG. 2C or FIG. 2D. An example of the patterned wafer is semiconductor device 302B albeit after having been subjected to the patterning.

More particularly, FIG. 3C shows semiconductor device 302C before the etching process is considered to have been completed. In FIG. 3C, while each central section 313X' has been substantially removed resulting in corresponding gate electrodes 323A1, 323A2, 323B1, 323B2, 323C1, 323C2, 323D1 and 323D2, some of the 'head' of T-shaped arms 313Y' and 313Z' remain. More particularly, the T-shape of each of arms 313Y' and 313Z' has a rectangular body of width $W_{313YZ'}$ and height $H_{END'}$, which is capped with a trapezoidal area. The larger and smaller bases of the trapezoidal area are parallel to the horizontal direction. The smaller base is contiguous with one end of the body of the T-shape such that the smaller base has a width $W_{313YZ''}$. Legs of the trapezoidal area taper away from the smaller base towards the larger base. The larger base has a width of approximately $W_{313X''}$.

Figure 3D:
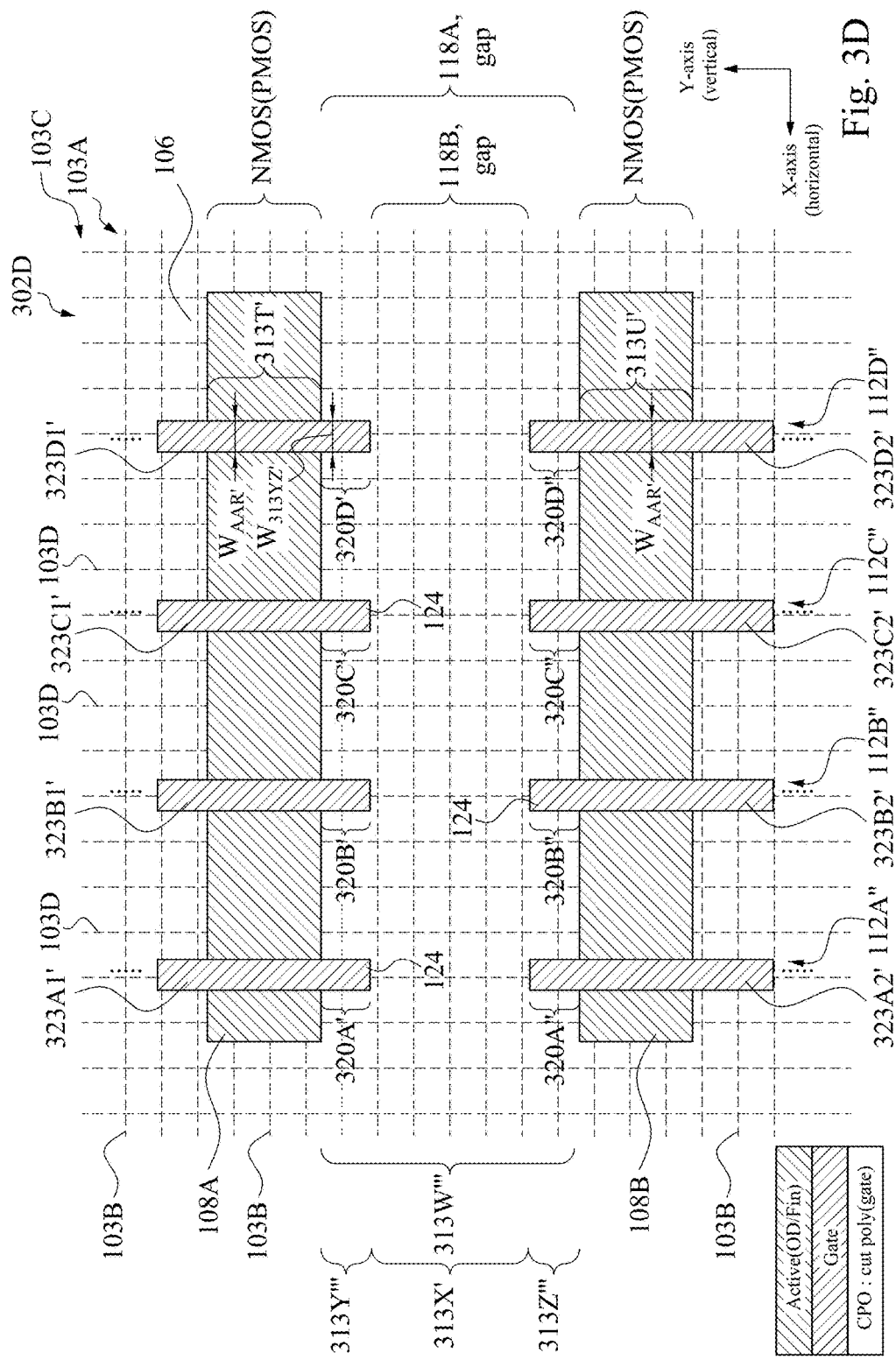
FIG. 3D is a layout diagram of a semiconductor device, in accordance with at least one embodiment of the present disclosure.

FIG. 3D is a layout diagram of a semiconductor device 302D, in accordance with at least one embodiment of the present disclosure. More particularly, FIG. 3D is a post-cut layout diagram showing structures of semiconductor device 302D resulting from having etched a patterned wafer, where the patterned wafer was produced/masked using a corresponding mask. An example of the corresponding mask is a mask which implements cut-pattern 216 of FIG. 2C or FIG. 2D. An example of the patterned wafer is semiconductor device 302B albeit after having been subjected to the patterning.

More particularly, FIG. 3D shows semiconductor device 302C after the etching process is considered to have been completed. In FIG. 3D, in addition to each central section 313X' having been substantially removed resulting in corresponding gate electrodes 323A1', 323A2', 323B1', 323B2', 323C1', 323C2', 323D1' and 323D2'. In addition, arms 313Y''' and 313Z''' are no longer T-shaped but instead are substantially rectangular resulting in gate-extensions 320A', 320A'', 320B', 320B'', 320C', 320C'', 320D' and 320D'' 120C' and 120D'. Comparing FIG. 3D to FIG. 1B, gate electrodes 323A1', 323A2', 323B1', 323B2', 323C1', 323C2', 323D1' and 323D2' in FIG. 3D correspond to gate electrodes 112A', 112B', 112C' and 112D' in FIG. 1B. Further comparing FIG. 3D to FIG. 1B, gate-extensions 320A', 320B', 320C' and 320D' in FIG. 3D correspond to gate-extensions 120A', 120B', 120C' and 120D' in FIG. 1B, and gate-extensions 320A'', 320B'', 320C'' and 320D'' in FIG. 3D correspond to gate-extensions 120A'', 120B'', 120C'' and 120D'' in FIG. 1B, Again, compared to deformed shape 124, which is triangular or conical and which is an over-etch distortion, the substantially rectangular shape of gate-extensions 120A', 120A'', 120B', 120B'', 120C', 120C'', 120D' and 120D'' more effectively facilitates the functional connection between associated gate electrodes 112A', 112A'', 112B', 112B'', 112C', 112C'', 112D' and 112D'' and corresponding underlying active regions 108A-108B.

FIG. 4 is a cross-sectional diagram of a mask 402A for use in imaging a squared gate-extensions region of a semiconductor device onto a wafer, in accordance with some embodiments. In some embodiments, mask 402A corresponds to mask 302A of FIG. 3A. As such, FIG. 4 is similar to FIG. 3A. Accordingly, relative to FIG. 3A, the numbering of similar objects in FIG. 4A is increased by 100.

In FIG. 4, mask 402 includes a substrate 434 and portions 438A, 438B and 438C of a layer 436, which is opaque, formed on substrate 434 of FIG. 4. Layer 336 has apertures 423A and 423B, which correspond to apertures 323A and 323B in FIG. 3A. In some embodiments, substrate 434 is a transparent material. In some embodiments, substrate 434 is quartz.

Figure 5A:
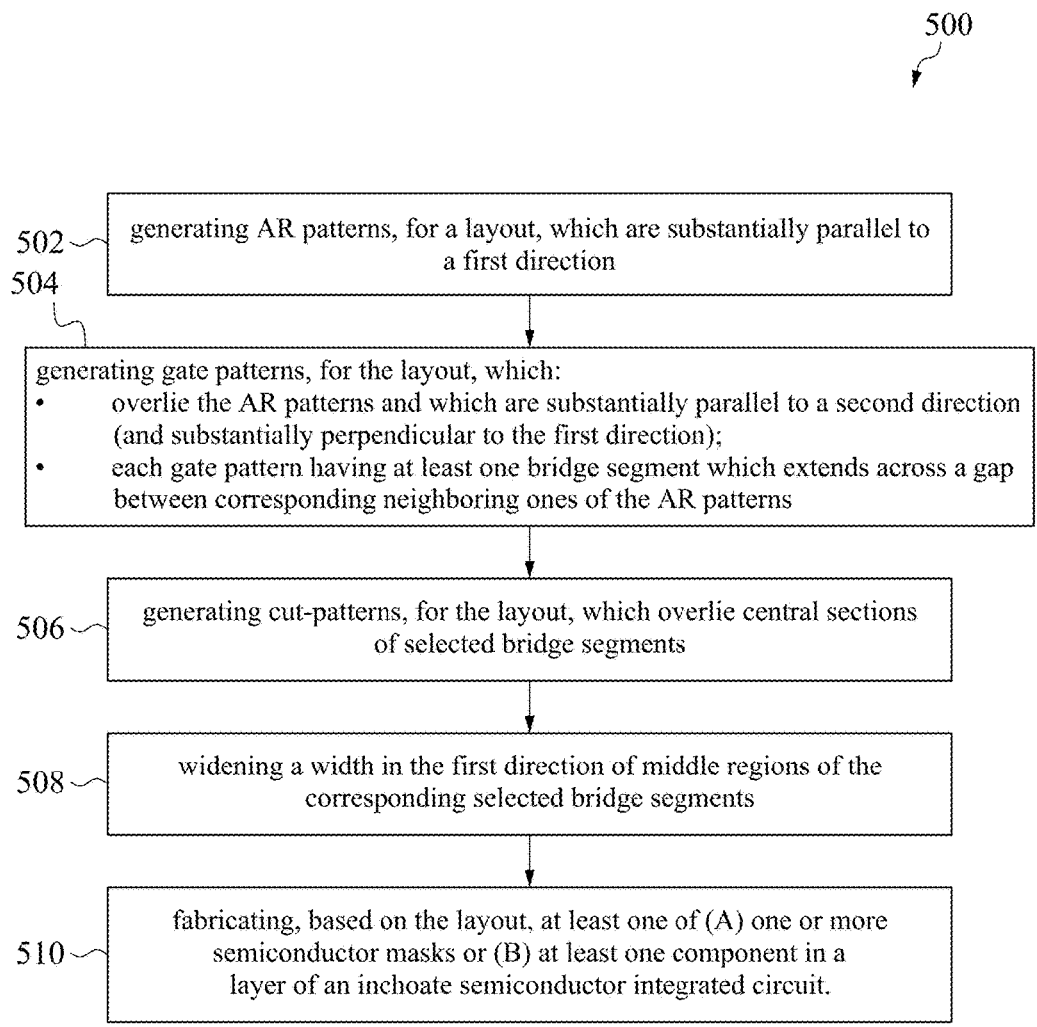
FIG. 5A is a flowchart of a method of generating a layout diagram of a semiconductor device, in accordance with some embodiments.

FIG. 5A is a flowchart of a method 500 of generating a layout diagram of a semiconductor device, in accordance with some embodiments. In some embodiments, method 500 is used to generate an instance of layout diagram 202C of a squared gate-extensions region 102 of a semiconductor device. In some embodiments, method 500 is used to generate an instance of layout diagram 202D of a squared gate-extensions region 102 of a semiconductor device.

In FIG. 5A, the flowchart of method 500 includes blocks 502-510. At least one of blocks 502, 504, 506 or 508 is executed by a processor of a computer. An example of the processor is a processor 602 of FIG. 6 (discussed below). An example of the computer is an electronic design automation (EDA) system 600 of FIG. 6 (discussed below). In some embodiments, each of blocks 502-508 is executed by the processor of the computer. In some embodiments, the layout generated by method 500 is stored on a non-transitory computer-readable medium. An example of the non-transitory computer-readable medium is layout 607 of FIG. 6 (discussed below).

At a block 502 of FIG. 5, AR patterns are generated for the layout. The AR patterns are arranged in a first grid oriented in a first direction. An example of the first grid is grid 103A of FIG. 2A, and an example of the first direction is the horizontal direction. Examples of the AR patterns are AR patterns 208A-208B of FIG. 2A. From block 502, flow proceeds to a block 504. At block 504, gate patterns are generated for the layout. The gate patterns are arranged spaced apart in a second grid and overlying corresponding ones of the AR patterns. The second grid is oriented in a second direction, where the second direction is perpendicular to the first direction. An example of the second grid is grid 103C of FIG. 2A, and an example of the second direction is the vertical direction. Examples of the gate patterns are gate patterns 212A-212D of FIG. 2A. Gaps, which are interspersed between neighboring ones of the AR patterns, are overlied by corresponding bridge segments of the gate patterns. Each bridge segment includes two arm sections separated by a central section. Examples of the bridge segments are bridge segments 213W of FIG. 2A. As such, examples of the central sections are central sections 213X of FIG. 2A, and examples of the arm sections are corresponding arm sections 213Y and 213Z of FIG. 2A. From block 504, flow proceeds to a block 506.

At block 506, cut-patterns are generated which overlie the central sections of selected ones of the bridge segments. Examples of the cut-patterns are instances of cut-pattern 216 of FIG. 2B. From block 506, flow proceeds to a block 508. At block 508, a width in the first direction of middle regions of the corresponding selected bridge segments is widened in the horizontal direction to be width $W_{213X}$. An example of the widened middle region is central section 213X' of FIG. 2C and proximal ends of arm sections 213Y' and 213Z', where each of arm sections 213Y' and 213Z' has a proximal end and a distal end, the proximal end being nearer to central section 213X' than the distal end. Each of the middle sections is widened such that width $W_{213X}$ of each of the middle regions is greater than width $W_{AAR}$ of each of corresponding AAR segments 213T-213U as follows:

$$W_{213X} > W_{AAR}.$$

From block 508, flow proceeds to a block 510. At block 510, based on the layout, at least one of (A) one or more semiconductor masks is fabricated (see FIG. 7, discussed below) or (B) at least one component in a layer of an inchoate semiconductor integrated circuit is fabricated (again, see FIG. 7, discussed below).

Figure 5B:
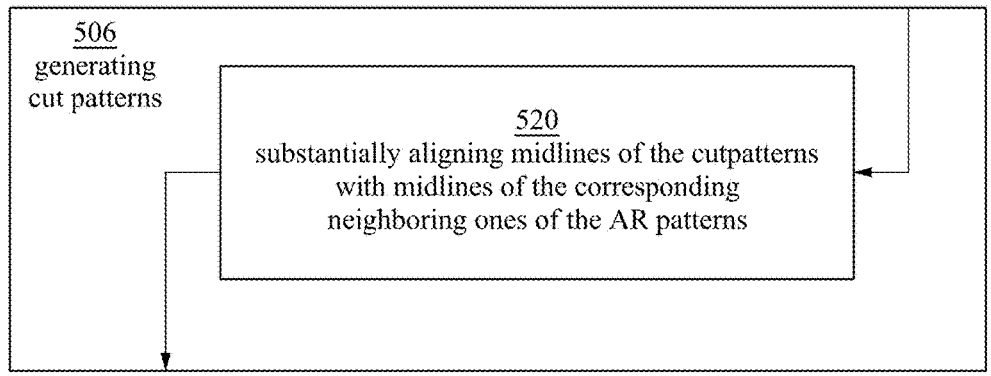
FIG. 5B is a more detailed view of a block in FIG. 5A, in accordance with at least one embodiment of the present disclosure.

FIG. 5B is a more detailed view of block 506 of FIG. 5A, in accordance with at least one embodiment of the present disclosure.

In FIG. 5B, block 506 includes a block 520. At block 520, midlines of the cut-patterns are substantially aligned with midlines of the corresponding neighboring ones of the AR patterns.

Figure 5C:
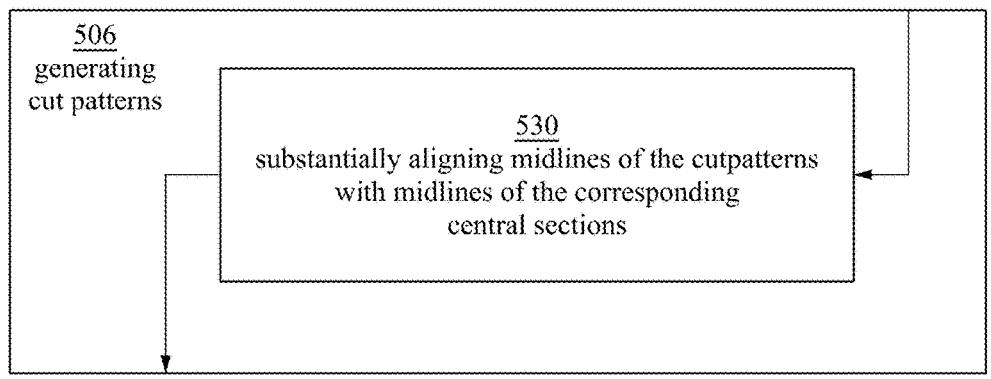
FIG. 5C is a more detailed view of a block in FIG. 5A, in accordance with at least one embodiment of the present disclosure.

FIG. 5C is a more detailed view of block 506 of FIG. 5A, in accordance with at least one embodiment of the present disclosure.

In FIG. 5C, block 506 includes a block 530. At block 530, midlines of the cut-patterns are substantially aligned with midlines of the corresponding central sections.

Figure 5D:
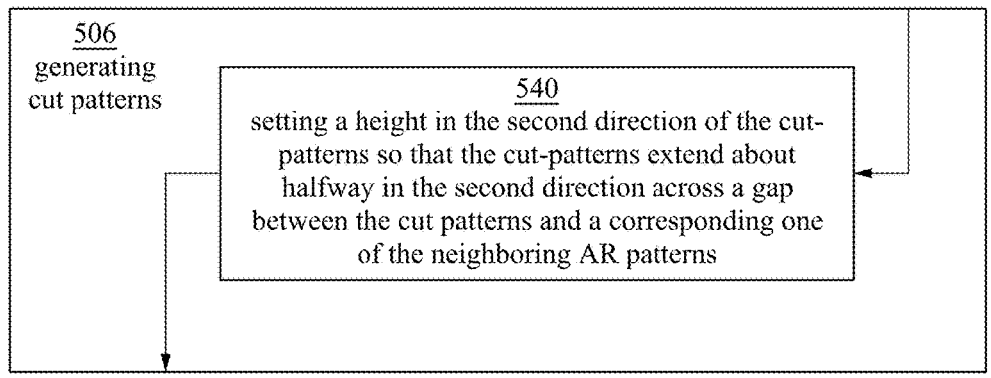
FIG. 5D is a more detailed view of a block in FIG. 5A, in accordance with at least one embodiment of the present disclosure.

FIG. 5D is a more detailed view of block 506 of FIG. 5A, in accordance with at least one embodiment of the present disclosure.

In FIG. 5D, block 506 includes a block 540. At block 540, the height of the cut-patterns is chosen. In particular, the height of the cut-patterns is chosen so that the cut-patterns extend about halfway in the second direction across a gap between the cut patterns and a corresponding one of the neighboring AR patterns. Again, an example of the second direction is the vertical direction. Examples of the gap between the cut patterns and a corresponding one of the neighboring AR patterns are the gaps underlying arm sections 213Y' and 213Z' of FIG. 2C.

Figure 5E:
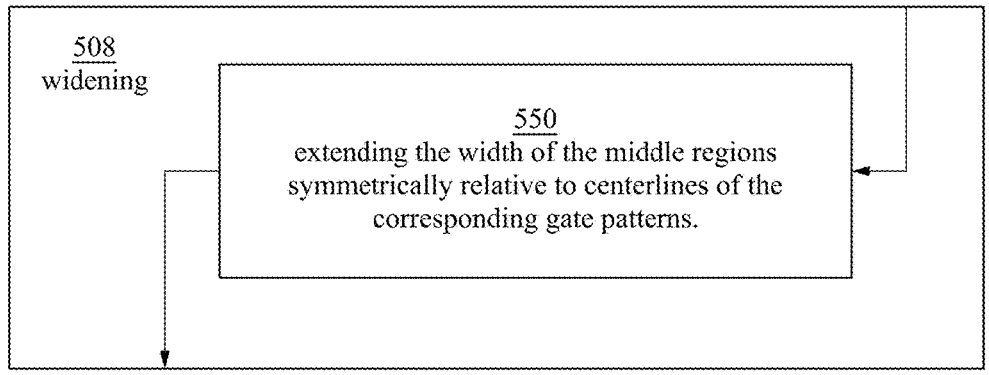
FIG. 5E is a more detailed view of a block in FIG. 5A, in accordance with at least one embodiment of the present disclosure.

FIG. 5E is a more detailed view of block 508 of FIG. 5A, in accordance with at least one embodiment of the present disclosure.

In FIG. 5E, block 508 includes a block 550. At block 550, the width of the central sections is extended symmetrically relative to centerlines of the corresponding gate patterns.

Figure 5F:
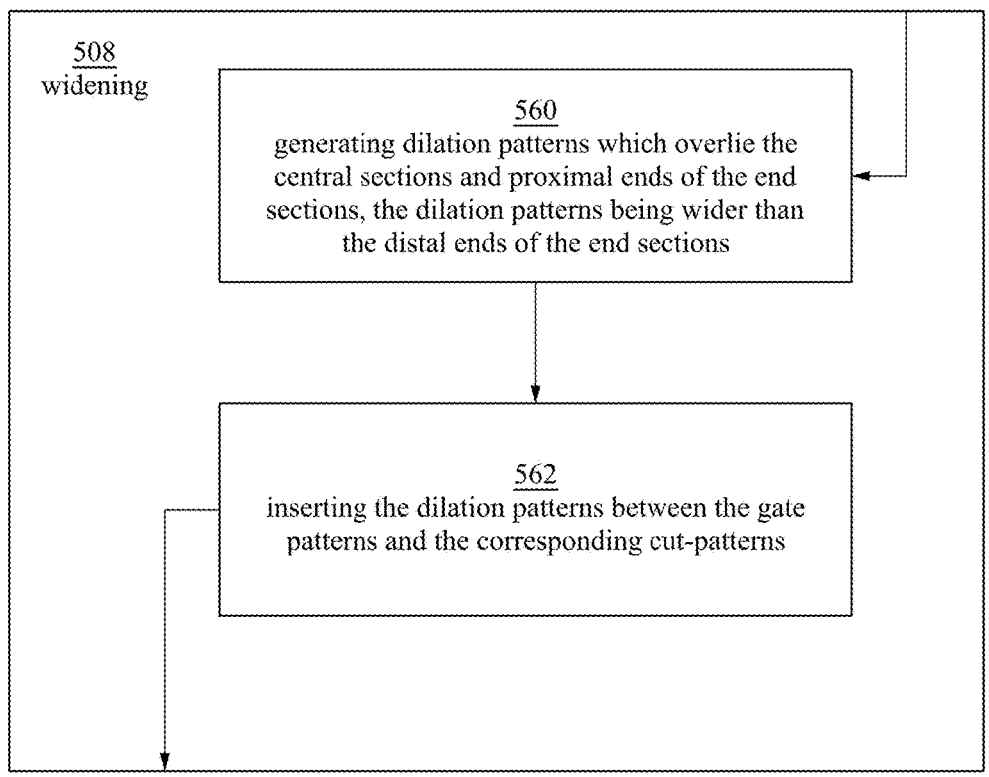
FIG. 5F is a more detailed view of a block in FIG. 5A, in accordance with at least one embodiment of the present disclosure.

FIG. 5F is a more detailed view of block 508 of FIG. 5A, in accordance with at least one embodiment of the present disclosure.

In FIG. 5F, block 508 includes blocks 560-562. At block 560, for the selected bridge segments, dilation patterns are generated which overlie the corresponding central sections, and also overlie the corresponding proximal ends of the arm sections. It is noted that the middle region of each bridge segment includes two arm sections separated by the corresponding central section, where each arm section has a proximal end and a distal end, the proximal end being nearer to the central section than the distal end. The dilation patterns are wider than the distal ends of the arm sections. From block 560, flow proceeds to block 562. At block 562, the dilation patterns are inserted into the layout diagram between the gate patterns and the corresponding cut-patterns.

Figure 5G:
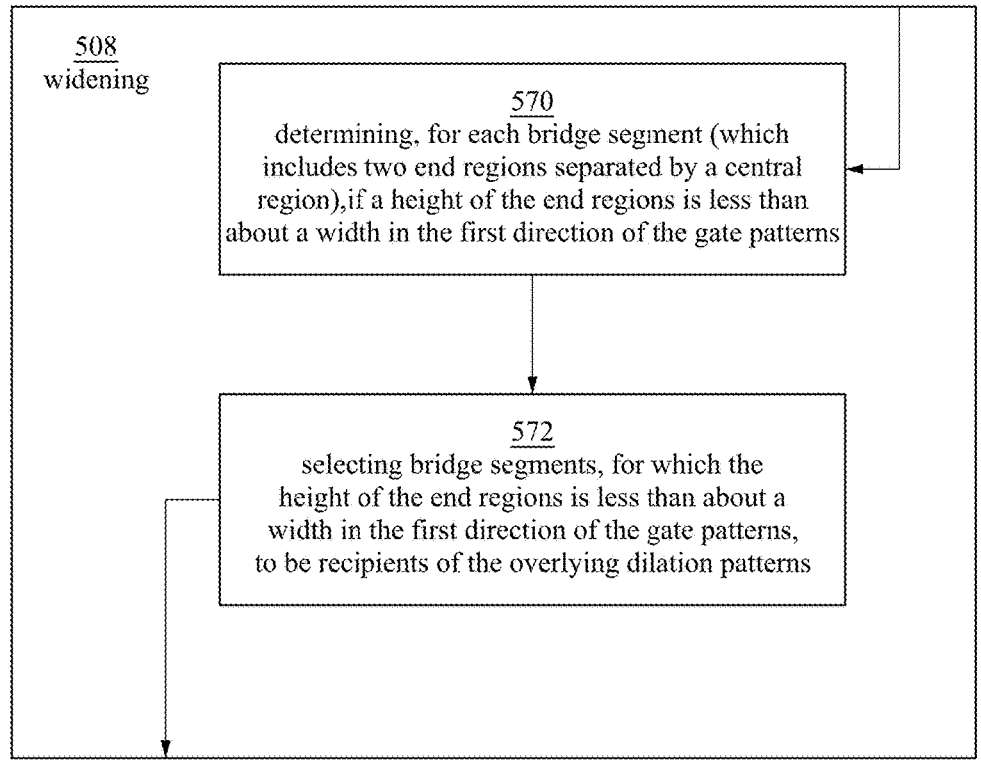
FIG. 5G is a more detailed view of a block in FIG. 5A, in accordance with at least one embodiment of the present disclosure.

FIG. 5G is a more detailed view of block 508 of FIG. 5A, in accordance with at least one embodiment of the present disclosure.

In FIG. 5G, block 508 includes blocks 570-572. At block 570, for each bridge segment, is it determined if a height of the arm sections is less than about a width in the first direction of the gate patterns, wherein each bridge segment includes two arm sections separated by a central section. From block 570, flow proceeds to block 572. At block 572, bridge segments, for which the height of the arm sections is less than about the width in the first direction of the gate patterns, are selected to be subjected to the widening.

Figure 5H:
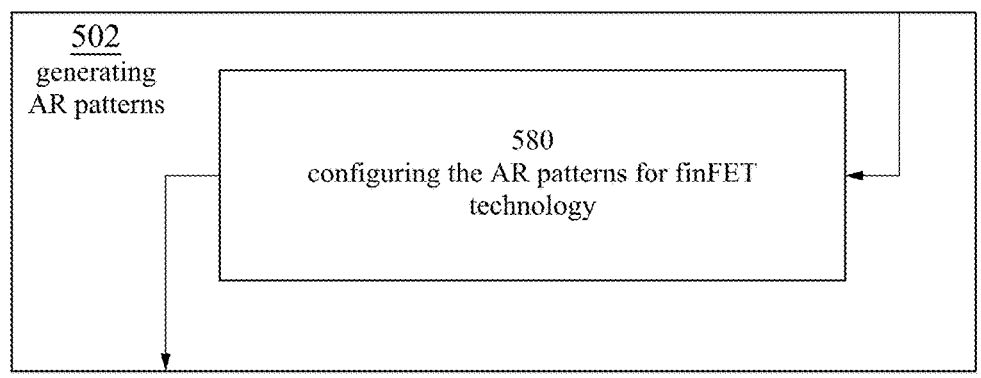
FIG. 5H is a more detailed view of a block in FIG. 5A, in accordance with at least one embodiment of the present disclosure.

FIG. 5H is a more detailed view of block 502 of FIG. 5A, in accordance with at least one embodiment of the present disclosure.

In FIG. 5H, block 502 includes a block 580. At block 580, the AR patterns are configured for finFET technology.

Figure 5I:
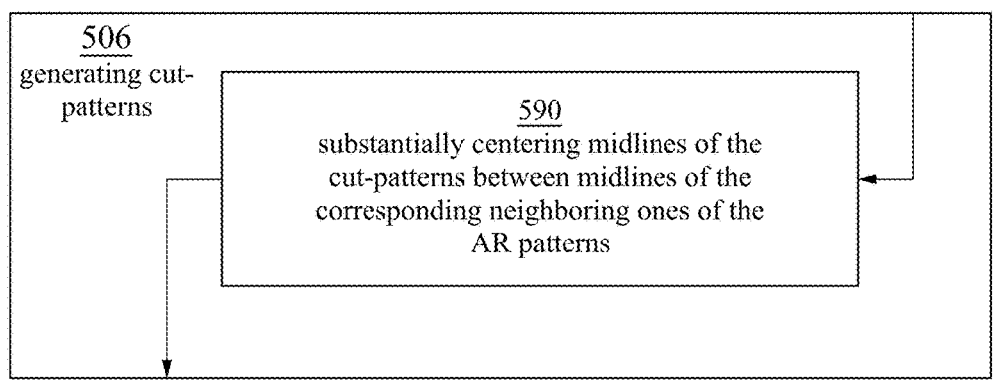
FIG. 5I is a more detailed view of a block in FIG. 5A, in accordance with at least one embodiment of the present disclosure.

FIG. 5I is a more detailed view of block 506 of FIG. 5A, in accordance with at least one embodiment of the present disclosure.

In FIG. 5I, block 506 includes a block 590. At block 590, midlines of the cut-patterns are substantially centered between midlines of the corresponding neighboring ones of the AR patterns.

Figure 6:
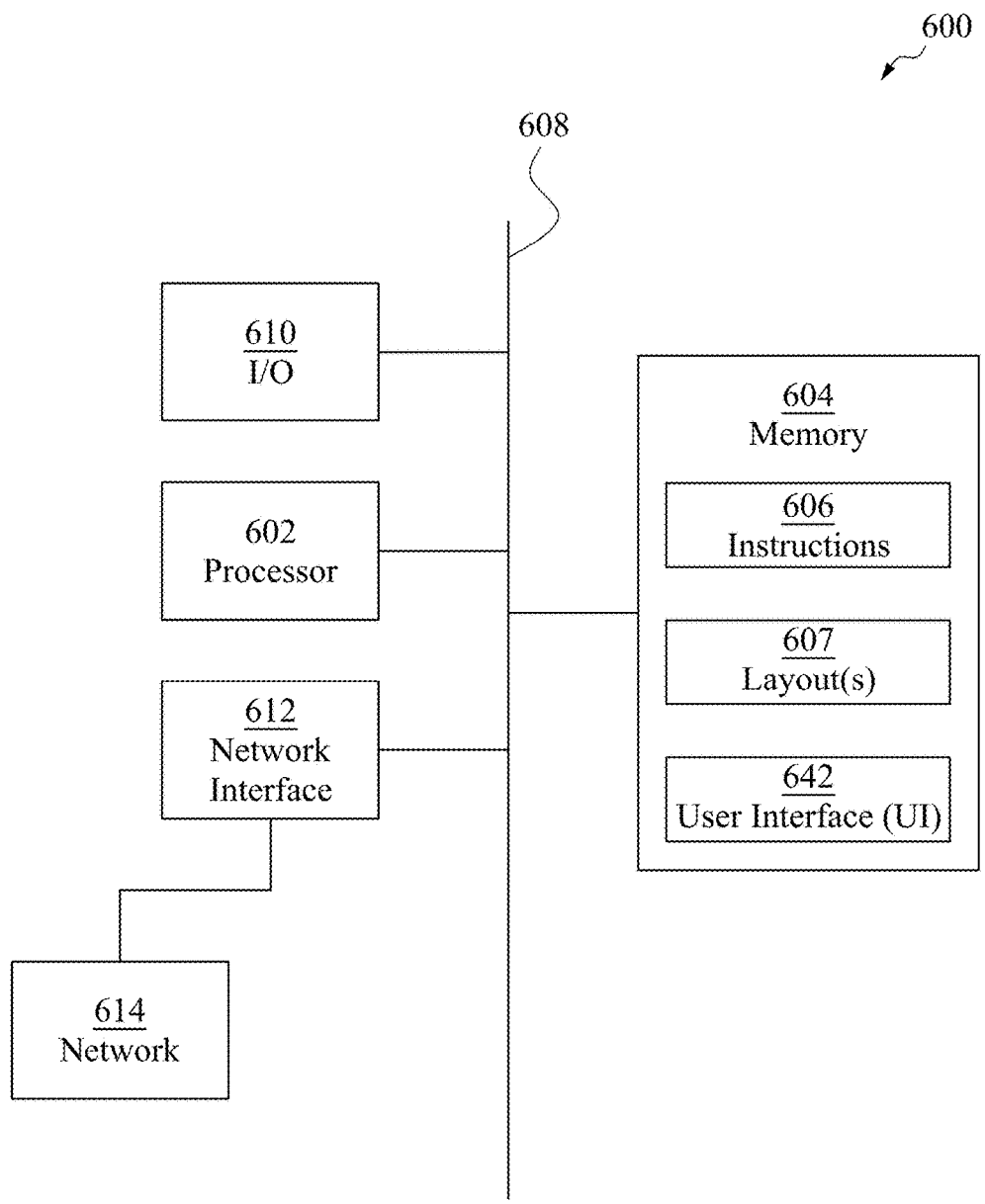
FIG. 6 is a block diagram of an electronic design automation (EDA) system, in accordance with at least one embodiment of the present disclosure.

FIG. 6 is a block diagram of an electronic design automation (EDA) system 600, in accordance with at least one embodiment of the present disclosure.

In some embodiments, EDA system 600 includes an APR system. The method of flowcharts of FIGS. 5A-5G are implemented, for example, using EDA system 600, in accordance with some embodiments.

In some embodiments, EDA system 600 is a general purpose computing device including a hardware processor 602 and a non-transitory, computer-readable storage medium 604. Storage medium 604, amongst other things, is encoded with, i.e., stores, computer program code 606, i.e., a set of executable instructions. Execution of instructions 606 by hardware processor 602 represents (at least in part) an EDA tool which implements a portion or all of, e.g., the methods of FIGS. 5A-5F, in accordance with one or more embodiments (hereinafter, the noted processes and/or methods).

Processor 602 is electrically coupled to computer-readable storage medium 604 via a bus 608. Processor 602 is also electrically coupled to an I/O interface 610 by bus 608. A network interface 612 is also electrically connected to processor 602 via bus 608. Network interface 612 is connected to a network 614, so that processor 602 and computer-readable storage medium 604 are capable of connecting to external elements via network 614. Processor 602 is configured to execute computer program code 606 encoded in computer-readable storage medium 604 in order to cause system 600 to be usable for performing a portion or all of the noted processes and/or methods. Computer-readable storage medium 604 also includes one or more layouts 607 generated according to a portion or all of the noted processes and/or methods. In one or more embodiments, processor 602 is a central processing unit (CPU), a multi-processor, a distributed processing system, an application specific integrated circuit (ASIC), and/or a suitable processing unit.

In one or more embodiments, computer-readable storage medium 604 is an electronic, magnetic, optical, electromagnetic, infrared, and/or a semiconductor system (or apparatus or device). For example, computer-readable storage medium 604 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 604 includes a compact disk-read only memory (CD-ROM), a compact disk-read/write (CD-R/W), and/or a digital video disc (DVD).

In one or more embodiments, storage medium 604 stores computer program code 606 configured to cause system 600 (where such execution represents (at least in part) the EDA tool) to be usable for performing a portion or all of the noted processes and/or methods. In one or more embodiments, storage medium 604 also stores information which facilitates performing a portion or all of the noted processes and/or methods. In one or more embodiments, storage medium 604 stores a library (not shown) of standard cells.

EDA system 600 includes I/O interface 610. I/O interface 610 is coupled to external circuitry. In one or more embodiments, I/O interface 610 includes a keyboard, keypad, mouse, trackball, trackpad, touchscreen, and/or cursor direction keys for communicating information and commands to processor 602.

Again, EDA system 600 includes network interface 612. Network interface 612 includes wireless network interfaces such as BLUETOOTH, WIFI, WIMAX, GPRS, or WCDMA; or wired network interfaces such as ETHERNET, USB, or IEEE-1564. In one or more embodiments, a portion or all of noted processes and/or methods, is implemented in two or more systems 600.

System 600 is configured to receive information through I/O interface 610. The information received through I/O interface 610 includes one or more of instructions, data, design rules, libraries of standard cells, and/or other parameters for processing by processor 602. The information is transferred to processor 602 via bus 608. EDA system 600 is configured to receive information related to a UI through I/O interface 610. The information is stored in computer-readable medium 604 as user interface (UI) 642.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by EDA system 600. In some embodiments, a layout is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 7:
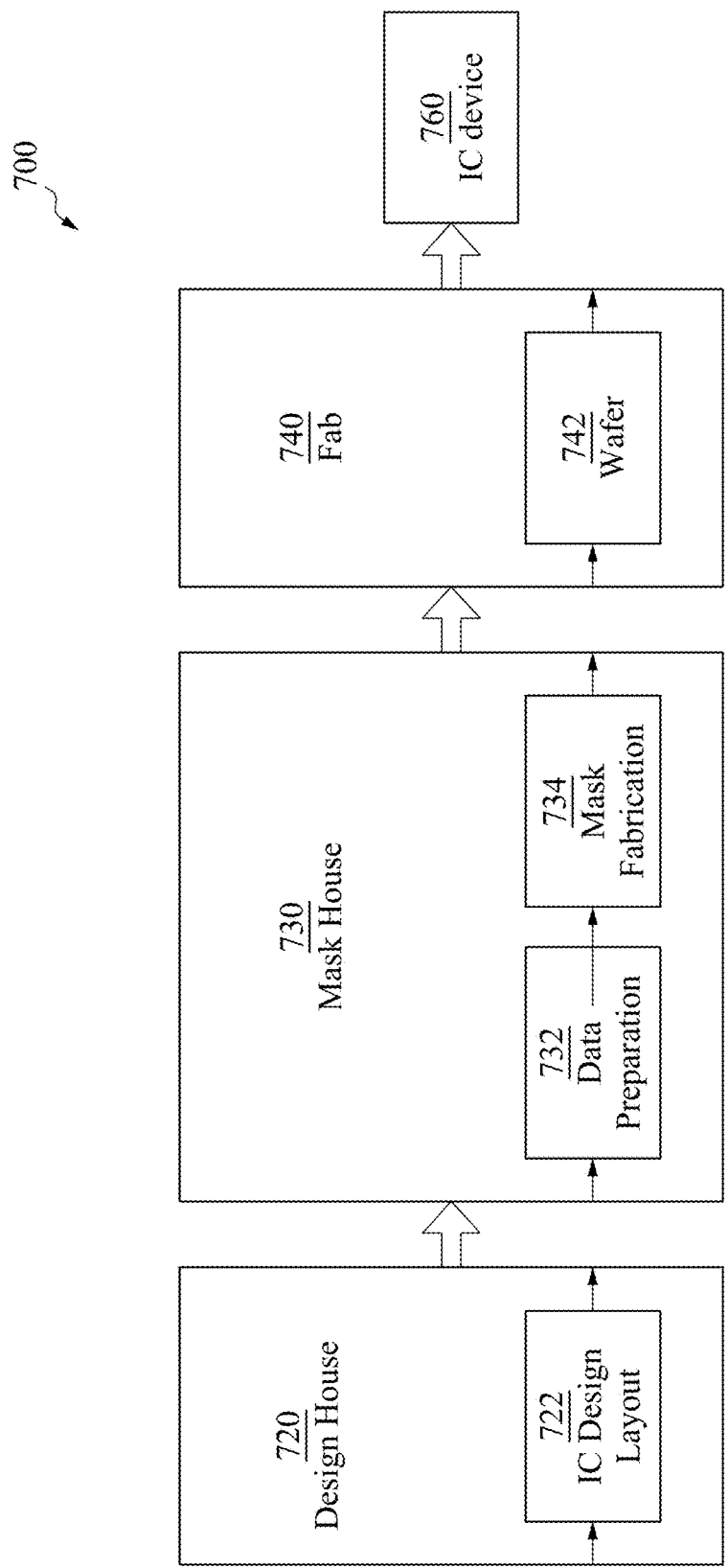
FIG. 7 is a block diagram of an integrated circuit (IC) manufacturing system, and an IC manufacturing flow associated therewith, in accordance with at least one embodiment of the present disclosure.

FIG. 7 is a block diagram of an integrated circuit (IC) manufacturing system 700, and an IC manufacturing flow associated therewith, in accordance with at least one embodiment of the present disclosure.

In FIG. 7, IC manufacturing system 700 includes entities, such as a design house 720, a mask house 730, and an IC manufacturer/fabricator ("fab") 740, that interact with one another in the design, development, and manufacturing cycles and/or services related to manufacturing an IC device 760. The entities in system 700 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 720, mask house 730, and IC fab 740 is owned by a single larger company. In some embodiments, two or more of design house 720, mask house 730, and IC fab 740 coexist in a common facility and use common resources.

Design house (or design team) 720 generates an IC design layout 722. IC design layout 722 includes various geometrical patterns designed for an IC device 760. The geometrical patterns correspond to patterns of metal, oxide, or semiconductor layers that make up the various components of IC device 760 to be fabricated. The various layers combine to form various IC features. For example, a portion of IC design layout 722 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 720 implements a proper design procedure to form IC design layout 722. The design procedure includes one or more of logic design, physical design or place and route. IC design layout 722 is presented in one or more data files having information of the geometrical patterns. For example, IC design layout 722 can be expressed in a GDSII file format or DFII file format.

Mask house 730 includes data preparation 732 and mask fabrication 734. Mask house 730 uses IC design layout 722 to manufacture one or more masks to be used for fabricating the various layers of IC device 760 according to IC design layout 722. Mask house 730 performs mask data preparation 732, where IC design layout 722 is translated into a representative data file ("RDF"). Mask data preparation 732 provides the RDF to mask fabrication 734. Mask fabrication 734 includes a mask writer. A mask writer converts the RDF to an image on a substrate, such as a mask (reticle) or a semiconductor wafer. The design layout is manipulated by mask data preparation 732 to comply with particular characteristics of the mask writer and/or requirements of IC fab 730. In FIG. 7, mask data preparation 732 and mask fabrication 734 are illustrated as separate elements. In some embodiments, mask data preparation 732 and mask fabrication 734 can be collectively referred to as mask data preparation.

In some embodiments, mask data preparation 732 includes optical proximity correction (OPC) which uses lithography enhancement techniques to compensate for image errors, such as those that can arise from diffraction, interference, other process effects and the like. OPC adjusts IC design layout 722. In some embodiments, mask data preparation 732 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 732 includes a mask rule checker (MRC) that checks the IC design layout that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout to compensate for limitations during mask fabrication 734, which may undo part of the modifications performed by OPC in order to meet mask creation rules.

In some embodiments, mask data preparation 732 includes lithography process checking (LPC) that simulates processing that will be implemented by IC fab 730 to fabricate IC device 760. LPC simulates this processing based on IC design layout 722 to create a simulated manufactured device, such as IC device 760. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout 722.

It should be understood that the above description of mask data preparation 732 has been simplified for the purposes of clarity. In some embodiments, mask data preparation 732 includes additional features such as a logic operation (LOP) to modify the IC design layout according to manufacturing rules. Additionally, the processes applied to IC design layout 722 during mask data preparation 732 may be executed in a variety of different orders.

After mask data preparation 732 and during mask fabrication 734, a mask or a group of masks are fabricated based on the modified IC design layout. In some embodiments, an electron-beam (e-beam) or a mechanism of multiple e-beams is used to form a pattern on a mask (photomask or reticle) based on the modified IC design layout. The mask can be formed in various technologies. In some embodiments, the mask is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask includes a transparent substrate (e.g., fused quartz) and an opaque material (e.g., chromium) coated in the opaque regions of the mask. In another example, the mask is formed using a phase shift technology. In the phase shift mask (PSM), various features in the pattern formed on the mask are configured to have proper phase difference to enhance the resolution and imaging quality. In various examples, the phase shift mask can be attenuated PSM or alternating PSM. The mask(s) generated by mask fabrication 734 is used in a variety of processes. For example, such a mask(s) is used in an ion implantation process to form various doped regions in the semiconductor wafer, in an etching process to form various etching regions in the semiconductor wafer, and/or in other suitable processes.

IC fab 730 is an IC fabrication business that includes one or more manufacturing facilities for the fabrication of a variety of different IC products. In some embodiments, IC Fab 730 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 730 uses the mask (or masks) fabricated by mask house 730 to fabricate IC device 760. Thus, IC fab 730 at least indirectly uses IC design layout 722 to fabricate IC device 760. In some embodiments, a semiconductor wafer 742 is fabricated by IC fab 730 using the mask (or masks) to form IC device 760. Semiconductor wafer 742 includes a silicon substrate or other proper substrate having material layers formed thereon. Semiconductor wafer 742 further includes one or more of various doped regions, dielectric features, multilevel interconnects, and the like (formed at subsequent manufacturing steps).

Details regarding an integrated circuit (IC) manufacturing system (e.g., system 700 of FIG. 7), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

In an embodiment, a semiconductor structure includes: active regions arranged in a first grid oriented in a first direction; and gate electrodes arranged spaced apart in a second grid and on corresponding ones of the active regions, the second grid being oriented in a second direction, the second direction being substantially perpendicular to the first direction. Each gate electrode includes two above-active-region (AAR) segments separated by a bridge segment, where the AAR segments are disposed on, and the bridge segment extends across a gap between, neighboring ones of the active regions. Each bridge segment includes two arms separated by a central section, each arm having a proximal end and a distal end, the proximal end being nearer to the central section than the distal end. Each arm is an inchoate squared gate-extension. A middle region of each bridge segment is substantially wider in the first direction than the corresponding arms.

In an embodiment, a photolithographic mask includes: a transparent substrate; and an opaque layer on the substrate, the opaque layer having apertures formed therein for photolithographically producing gate patterns on a semiconductor device including active regions arranged in a first grid oriented in a first direction. The apertures are arranged spaced apart in a second grid, the second grid being oriented in a second direction, the second direction being substantially perpendicular to the first direction. When the photolithographic mask is aligned with respect to the semiconductor device, the apertures overlie corresponding ones of the active regions. Relative to a top view: each aperture has a long axis substantially parallel to the second direction; each aperture, relative to the long axis, includes two above-active-region (AAR) portions separated by a bridge portion which extends across a gap between neighboring ones of the active area patterns; each bridge portion includes two arm zones separated by a central zone; and each central zone is substantially wider in the first direction than the AAR portions. In an embodiment, each aperture has a centerline substantially parallel to the second direction; and each aperture is substantially symmetric about the centerline thereof. In an embodiment, for each aperture, the arm zones of the corresponding bridge portion have a width, $W_E$, in the first direction and a height, $H_{END}$, in the second direction such that the width $W_E$ is greater than or equal to about $H_{END}$, as follows: $(\approx H_{END}) \leq W_E$. In an embodiment, for each aperture: the arm zones of the corresponding bridge portion have a height, $H_{END}$, in the second direction; each AAR portion has a width, $W_{AAR}$, in the first direction; and the height HEND is approximately equal to the width $W_{AAR}$. In an embodiments, for each aperture: a width in the first direction of the central zones, WC, falls in a range relative to multiples of a width of the arm zones, WE, as follows: $(\approx 2W_E) \leq WC \leq (\approx 3W_E)$.

In an embodiment, a semiconductor structure includes: first and second active regions arranged in a first grid oriented in a first direction; and gate electrodes arranged spaced apart in a second grid and on corresponding ones of the active regions, the second grid being oriented in a second direction, the second direction being substantially perpendicular to the first direction; wherein: the first and second active regions are separated, relative to the second direction, by a gap; each gate electrode includes a first segment and a gate extension; each gate extension extends, relative to the second direction, beyond the corresponding active region and into the gap by a height $H_{EXT}$, where $H_{EXT} \leq (\approx 150 \text{ nm})$; and each gate extension, relative to a plane defined by the first and second directions, is substantially rectangular. In an embodiment, the height $H_{EXT}$ is $H_{EXT} \leq (\approx 100$ nm). In an embodiment, for each gate extension, a width in the first direction, $W_E$, relates to the height $H_{EXT}$ in the second direction such that the width $W_E$ is greater than or equal to about $H_{EXT}$, as follows: $H_{EXT} \approx W_E$. In an embodiment, each first segment extends, relative to the second direction, beyond the corresponding active region to a side of the corresponding active region opposite the gap. In an embodiment, each of the first and second active regions is configured for finFET technology.

In an embodiment, a method (of generating a layout diagram of a semiconductor device, the layout diagram being stored on a non-transitory computer-readable medium) includes: generating AR patterns arranged in a first grid oriented in a first direction; generating gate patterns arranged spaced apart in a second grid and overlying corresponding neighboring ones of the AR patterns, the second grid being oriented in a second direction, the second direction being substantially perpendicular to the first direction; wherein each gate pattern has at least one bridge segment which extends across a gap between corresponding neighboring ones of the AR patterns; generating cut-patterns which overlie middle regions sections of selected ones of the bridge segments, the cut-patterns being indicative that corresponding underlying portions of the selected bridge segments and the dilation patterns will be removed subsequently; and widening a width in the first direction of middle regions of the corresponding selected bridge segments. At least one aspect of the method is executed by a processor of a computer. In an embodiment, the method further includes fabricating, based on the layout diagram, at least one of (A) one or more semiconductor masks or (B) at least one component in a layer of an inchoate semiconductor integrated circuit. In an embodiment, the generating the cut-pattern includes: substantially centering a midline of the cut-pattern between midlines of the corresponding neighboring ones of the AR patterns. In an embodiment, the generating a cut-pattern includes: substantially aligning a midline of the cut-pattern with midlines of the corresponding central sections. In an embodiment, the generating a cut-pattern includes: setting a height in the second direction of the cut-pattern so that the central sections extend about halfway in the second direction across a gap between the cut pattern and a corresponding one of the neighboring AR patterns. In an embodiment, the widening generating dilation patterns includes: extending the width of the dilation patterns symmetrically relative to centerlines of the corresponding gate patterns. In an embodiment, the middle region of each bridge segment includes two arm sections separated by the corresponding central section, each arm section having a proximal end and a distal end, the proximal end being nearer to the central section than the distal end; and the widening includes generating dilation patterns which overlie the central sections and proximal ends of the arm sections of the corresponding selected bridge segments, the dilation patterns being wider than the distal ends of the arm sections, and inserting the dilation patterns between the gate patterns and the cut-pattern. In an embodiment, each bridge segment includes two arm sections separated by a central section; and the widening includes determining, for each bridge segment, if a height of the arm sections is less than about a width in the first direction of the gate patterns; and selecting bridge segments, for which the height of the arm sections is less than about the width in the first direction of the gate patterns, to be subjected to the widening. In an embodiment, the widening is performed before performance of optical proximity correction (OPC). In an embodiment, the generating AR patterns includes: configuring the AR patterns for finFET technology.

In an embodiment, a method (of generating a layout diagram of a semiconductor device, the layout diagram being stored on a non-transitory computer-readable medium) includes: generating AR patterns arranged in a first grid oriented in a first direction; generating gate patterns arranged spaced apart in a second grid and overlying corresponding neighboring ones of the AR patterns, the second grid being oriented in a second direction, the second direction being substantially perpendicular to the first direction; wherein each gate pattern has at least one bridge segment which extends across a gap between corresponding neighboring ones of the AR patterns, a middle region of each bridge segment includes two arm sections separated by the corresponding central section, each arm section has a proximal end and a distal end, and the proximal end is nearer to the central section than the distal end; generating dilation patterns which overlie the central sections and proximal ends of the arm sections of the corresponding selected bridge segments, the dilation patterns being wider than the distal ends of the arm sections; and generating a cut-pattern which overlies the dilation patterns and is aligned, relative to the second direction, with corresponding middle regions of selected ones of the bridge segments, the cut-pattern being indicative that corresponding underlying portions of the dilation patterns which and the selected bridge segments will be removed subsequently; and wherein at least one aspect of the method is executed by a processor of a computer. In an embodiment, the method further includes: fabricating, based on the layout diagram, at least one of (A) one or more semiconductor masks or (B) at least one component in a layer of an inchoate semiconductor integrated circuit. In an embodiment, the generating the cut-pattern includes: setting a height in the second direction of the cut-pattern so that the central sections extend about halfway in the second direction across a gap between the cut pattern and a corresponding one of the neighboring AR patterns. In an embodiment, the generating the dilation patterns is performed before performance of optical proximity correction (OPC). In an embodiment, the generating AR patterns includes: configuring the AR patterns for finFET technology.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A method of generating a layout diagram of a semiconductor device, the layout diagram being stored on a non-transitory computer-readable medium, the method comprising:

generating active area (AR) patterns arranged in a first grid oriented in a first direction;

generating gate patterns arranged spaced apart in a second grid and overlying corresponding neighboring ones of the AR patterns, the second grid being oriented in a second direction, the second direction being substantially perpendicular to the first direction;

wherein each gate pattern has at least one bridge segment which extends across a gap between corresponding neighboring ones of the AR patterns;
generating a cut-pattern which overlies middle regions of selected ones of the bridge segments, the cut-pattern being indicative that corresponding underlying portions of the selected bridge segments will be removed subsequently; and
widening a width in the first direction of central sections of the corresponding selected bridge segments; and
wherein at least one aspect of the method is executed by a processor of a computer.

2. The method of claim 1, further comprising:
fabricating, based on the layout diagram, at least one of (A) one or more semiconductor masks or (B) at least one component in a layer of an inchoate semiconductor integrated circuit.

3. The method of claim 1, wherein the generating the cut-pattern includes:
substantially centering a midline of the cut-pattern between midlines of the corresponding neighboring ones of the AR patterns.

4. The method of claim 1, wherein the generating the cut-pattern includes:
substantially aligning a midline of the cut-pattern with midlines of the corresponding central sections.

5. The method of claim 1, wherein the generating the cut-pattern includes:
setting a height in the second direction of the cut-pattern so that the central sections extend about halfway in the second direction across a gap between the cut pattern and a corresponding one of the neighboring AR patterns.

6. The method of claim 1, wherein the widening includes:
extending the width of the central sections symmetrically relative to centerlines of the corresponding gate patterns.

7. The method of claim 1, wherein:
the middle region of each bridge segment includes two arm sections separated by the corresponding central section, each arm section having a proximal end and a distal end, the proximal end being nearer to the central section than the distal end; and
the widening includes:
generating dilation patterns which overlie the central sections and proximal ends of the arm sections of the corresponding selected bridge segments, the dilation patterns being wider than the distal ends of the arm sections; and
inserting the dilation patterns between the gate patterns and the cut-pattern.

8. The method of claim 1, wherein:
each bridge segment includes two arm sections separated by a central section; and
the widening includes:
determining, for each bridge segment, if a height of the arm sections is less than about a width in the first direction of the gate patterns; and
selecting bridge segments, for which the height of the arm sections is less than about the width in the first direction of the gate patterns, to be subjected to the widening.

9. The method of claim 1, wherein:
the widening is performed before performance of optical proximity correction (OPC).

10. The method of claim 1, wherein the generating AR patterns includes:
configuring the AR patterns for finFET technology.

11. A method of generating a layout diagram of a semiconductor device, the layout diagram being stored on a non-transitory computer-readable medium, the method comprising:
generating active area (AR) patterns arranged in a first grid oriented in a first direction;
generating gate patterns arranged spaced apart in a second grid and overlying corresponding neighboring ones of the AR patterns, the second grid being oriented in a second direction, the second direction being substantially perpendicular to the first direction;
wherein each gate pattern has at least one bridge segment which extends across a gap between corresponding neighboring ones of the AR patterns, a middle region of each bridge segment includes two arm sections separated by a corresponding central section, each arm section has a proximal end and a distal end, and the proximal end is nearer to the central section than the distal end;
generating dilation patterns which overlie the central sections and proximal ends of the arm sections of the corresponding selected bridge segments, the dilation patterns being wider than the distal ends of the arm sections; and
generating a cut-pattern which overlies the dilation patterns and is aligned, relative to the second direction, with corresponding middle regions of selected ones of the bridge segments, the cut-pattern being indicative that corresponding underlying portions of the dilation patterns which and the selected bridge segments will be removed subsequently; and
wherein at least one aspect of the method is executed by a processor of a computer.

12. The method of claim 11, further comprising:
fabricating, based on the layout diagram, at least one of (A) one or more semiconductor masks or (B) at least one component in a layer of an inchoate semiconductor integrated circuit.

13. The method of claim 11, wherein the generating the cut-pattern includes:
setting a height in the second direction of the cut-pattern so that the central sections extend about halfway in the second direction across a gap between the cut pattern and a corresponding one of the neighboring AR patterns.

14. The method of claim 11, wherein:
the generating the dilation patterns is performed before performance of optical proximity correction (OPC).

15. The method of claim 11, wherein the generating AR patterns includes:
configuring the AR patterns for finFET technology.

16. A method of generating a layout diagram of a semiconductor device, the layout diagram being stored on a non-transitory computer-readable medium, the method comprising:
generating active area (AR) patterns arranged in a first grid oriented in a first direction;
generating first pieces of corresponding gate patterns;
the first pieces being arranged spaced apart in a second grid and overlying corresponding neighboring ones of the AR patterns, the second grid being oriented in a second direction, the second direction being substantially perpendicular to the first direction; and
each first piece of each gate pattern having at least one bridge segment which extends across a gap between corresponding neighboring ones of the AR patterns;

each bridge segment including two arm sections separated by a corresponding central section, each arm section having a proximal end and a distal end, the proximal end being nearer to the central section than the distal end;

generating second pieces of corresponding selected ones of the gate patterns, each second piece overlying the central section and the proximal ends of the arm sections of the bridge segments of the corresponding selected one of the gate patterns, the second pieces being wider than the distal ends of the arm sections;

generating one or more cut-patterns which overlie middle regions of the bridge segments of the selected ones of the gate patterns, the cut-pattern being indicative that corresponding underlying portions of the corresponding bridge segment of the selected one of the gate pattern will be removed subsequently; and wherein at least one aspect of the method is executed by a processor of a computer.

17. The method of claim 16, further comprising:

fabricating, based on the layout diagram, at least one of (A) one or more semiconductor masks or (B) at least one component in a layer of an inchoate semiconductor integrated circuit.

18. The method of claim 16, wherein the generating one or more cut-patterns includes:

substantially centering midlines of the one or more cut-patterns between midlines of the corresponding neighboring ones of the AR patterns; or substantially aligning midlines of the one or more cut-patterns with midlines of the corresponding central sections.

19. The method of claim 16, wherein the generating second pieces includes:

extending widths of the second pieces of the corresponding selected ones of the gate patterns symmetrically relative to centerlines of the first pieces of the corresponding selected ones of the gate patterns.

20. The method of claim 16, wherein:

the generating second pieces is performed before performance of optical proximity correction (OPC).

* * * * *